(12) United States Patent
Senturk et al.

(10) Patent No.: US 7,676,390 B2
(45) Date of Patent: Mar. 9, 2010

(54) TECHNIQUES FOR PERFORMING BUSINESS ANALYSIS BASED ON INCOMPLETE AND/OR STAGE-BASED DATA

(75) Inventors: Deniz Senturk, Niskayuna, NY (US); Christina A. LaComb, Schenectady, NY (US); Roger W. Hoerl, Niskayuna, NY (US); Snehil Gambhir, Niskayuna, NY (US); Peter A. Kalish, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 1511 days.

(21) Appl. No.: 10/654,738

(22) Filed: Sep. 4, 2003

(65) Prior Publication Data

US 2005/0055257 A1    Mar. 10, 2005

(51) Int. Cl.
*G06Q 90/00* (2006.01)
(52) U.S. Cl. ............................. 705/7; 705/10
(58) Field of Classification Search ............ 705/10, 705/7
See application file for complete search history.

(56) References Cited

U.S. PATENT DOCUMENTS

| | | | |
|---|---|---|---|
| 5,063,506 A | 11/1991 | Brockwell et al. |
| 5,237,495 A | 8/1993 | Morii |
| 5,406,477 A | 4/1995 | Harhen |
| 5,461,699 A | 10/1995 | Arbabi et al. |
| 5,463,555 A | 10/1995 | Ward et al. |
| 5,630,070 A | 5/1997 | Dietrich et al. |
| 5,638,519 A | 6/1997 | Haluska |
| 5,781,442 A | 7/1998 | Engleson et al. |
| 5,787,437 A | 7/1998 | Potterveld et al. |
| 5,793,632 A | 8/1998 | Fad et al. |

(Continued)

FOREIGN PATENT DOCUMENTS

EP    1271386    1/2003

(Continued)

OTHER PUBLICATIONS

Dempster, A.P., et al., "Maximum Likelihood from Incomplete Data via the EM Algorithm." Journal of the Royal Statistical Society, 39:1 (1977) pp. 1-38.*

(Continued)

*Primary Examiner*—Beth V Boswell
*Assistant Examiner*—Neil R Kardos
(74) *Attorney, Agent, or Firm*—Scott J. Asmus

(57) ABSTRACT

Electrical data processing techniques are described for performing business analysis based on datasets that are incomplete (e.g., contain censored data) and/or based on datasets that are derived from a stage-based business operation. A first technique offsets the effects of error caused by the incomplete dataset by performing a trending operation followed by a de-trending operation. A second technique provides a model containing multiple sub-models, where the output of one sub-model serves as the input to another sub-model in recursive fashion. A third technique determines when a specified event is likely to occur with respect to a given asset by first discriminating whether the event is very unlikely to occur; if the asset does not meet this initial test, it is further processed by a second sub-model, which determines the probability that the specified event will occur for each of a specified series of time intervals.

10 Claims, 12 Drawing Sheets

U.S. PATENT DOCUMENTS

| | | | |
|---|---|---|---|
| 5,799,286 | A | 8/1998 | Morgan et al. |
| 5,809,477 | A | 9/1998 | Pollack |
| 5,845,270 | A | 12/1998 | Schatz et al. |
| 5,854,746 | A | 12/1998 | Yamamoto et al. |
| 5,930,764 | A | 7/1999 | Melchione et al. |
| 5,953,707 | A | 9/1999 | Huang et al. |
| 5,970,476 | A | 10/1999 | Fahey |
| 6,006,196 | A | 12/1999 | Feigin et al. |
| 6,029,139 | A | 2/2000 | Cunningham et al. |
| 6,038,537 | A | 3/2000 | Matsuoka |
| 6,038,540 | A | 3/2000 | Krist et al. |
| 6,044,357 | A | 3/2000 | Garg |
| 6,058,375 | A | 5/2000 | Park |
| 6,078,893 | A | 6/2000 | Ouimet et al. |
| 6,125,355 | A | 9/2000 | Bekaert et al. |
| 6,151,582 | A | 11/2000 | Huang et al. |
| 6,175,824 | B1 | 1/2001 | Breitzman et al. |
| 6,236,955 | B1 | 5/2001 | Summers |
| 6,236,977 | B1 | 5/2001 | Verba et al. |
| 6,249,770 | B1 | 6/2001 | Erwin et al. |
| 6,308,162 | B1 | 10/2001 | Ouimet et al. |
| 6,408,263 | B1 | 6/2002 | Summers |
| 6,487,665 | B1 | 11/2002 | Andrews et al. |
| 6,611,839 | B1 | 8/2003 | Nwabueze |
| 6,807,531 | B1 | 10/2004 | Kanai |
| 6,907,428 | B2 | 6/2005 | Fitzpatrick et al. |
| 6,995,768 | B2 | 2/2006 | Jou et al. |
| 7,006,981 | B2 | 2/2006 | Rose et al. |
| 7,013,285 | B1 * | 3/2006 | Rebane ............... 705/10 |
| 7,043,461 | B2 | 5/2006 | Kehder et al. |
| 7,043,531 | B1 | 5/2006 | Seibel et al. |
| 7,062,479 | B2 | 6/2006 | Edmunds et al. |
| 7,162,427 | B1 | 1/2007 | Myrick et al. |
| 7,236,940 | B2 | 6/2007 | Chappel |
| 2001/0013005 | A1 | 8/2001 | Matsuzuki |
| 2001/0032029 | A1 | 10/2001 | Kauffman |
| 2001/0032195 | A1 | 10/2001 | Graichen et al. |
| 2002/0022985 | A1 | 2/2002 | Guidice et al. |
| 2002/0077792 | A1 | 6/2002 | Qiu |
| 2002/0099571 | A1 | 7/2002 | Waku et al. |
| 2002/0138316 | A1 | 9/2002 | Katz et al. |
| 2002/0173999 | A1 | 11/2002 | Griffor et al. |
| 2002/0174049 | A1 | 11/2002 | Kitahara |
| 2002/0194056 | A1 | 12/2002 | Summers |
| 2003/0028437 | A1 | 2/2003 | Grant et al. |
| 2003/0046123 | A1 | 3/2003 | Chen |
| 2003/0050794 | A1 | 3/2003 | Keck |
| 2003/0083912 | A1 | 5/2003 | Covington et al. |
| 2003/0084053 | A1 | 5/2003 | Govrin et al. |
| 2003/0123640 | A1 | 7/2003 | Roelle et al. |
| 2003/0149603 | A1 * | 8/2003 | Ferguson et al. ............. 705/7 |
| 2003/0149682 | A1 | 8/2003 | Earley et al. |
| 2003/0216939 | A1 | 11/2003 | Bito et al. |
| 2004/0054600 | A1 * | 3/2004 | Shike et al. ............. 705/26 |
| 2004/0064357 | A1 * | 4/2004 | Hunter et al. ............. 705/10 |
| 2004/0088211 | A1 * | 5/2004 | Kakouros et al. ............. 705/10 |
| 2004/0193451 | A1 | 9/2004 | McNair |
| 2004/0204914 | A1 | 10/2004 | Milland |
| 2005/0004789 | A1 | 1/2005 | Summers |
| 2005/0197875 | A1 | 9/2005 | Kauffman |
| 2006/0059028 | A1 | 3/2006 | Eder |

FOREIGN PATENT DOCUMENTS

| | | |
|---|---|---|
| JP | 05189495 | 7/1993 |
| JP | 07253963 | 3/1995 |
| JP | 2002056080 | 2/2002 |
| JP | 2003058680 | 2/2003 |
| JP | 2005165513 | 6/2005 |
| JP | 2005216024 | 8/2005 |
| JP | 2005293046 | 10/2005 |
| WO | WO9725682 | 7/1997 |
| WO | WO01/79994 A2 | 10/2001 |
| WO | WO0213102 | 2/2002 |
| WO | WO0219221 | 3/2002 |
| WO | WO0227578 | 4/2002 |
| WO | WO02082348 | 10/2002 |
| WO | WO03025703 | 3/2003 |
| WO | WO2004042563 | 5/2004 |
| WO | WO2005033832 | 4/2005 |

OTHER PUBLICATIONS

Joreskog, Karl G., "Censored Variables and Censored Regression." (Dec. 2002) Available at http://www.ssicentral.com/lisrel/techdocs/censor.pdf.*

Ramoni, Macro, and Paola Sebastiani, "Robust Learning with Missing Data." Machine Learning, 45 (2001) pp. 147-170.*

"After Jack, a Change of Style Only", Financial Times, Sep. 5, 2001, 2 pgs.

Blattner, "Special Edition Using Microsoft Excel 2002", Que, May 18, 2001, 30 pgs.

Blix, et al., "Inflation Forecasts with Uncertainty Intervals", 2 Quarterly Review—Sveriges Riksbank, Dec. 1999, 17 pgs.

Business Wire, "GE Fanuc Introduces Proficy Real-Time Information Portal", Business Wire, Aug. 20, 2004, 2 pgs.

CIO Insight, "Creating the Real-Time Manager", CIO Insight, New York, Nov. 2, 2002, vol. 1, Issue 20, 3 pgs.

Cognos Corp. White Paper, "Connecting the User to the Business with Reporting and Analysis", Cognos Corporation, Oct. 2001, 14 pgs.

Cognos Corporation, "Cognos e-Applications," May 2001, 28 pgs.

"Cognos(R) Announces Support for Microsoft SQL Server 2000 Analysis Services," Canada NewsWire, Ottawa, Sep. 27, 2000, 2 pgs.

"Cognos(R) Demonstrates Market-Leading Business Intelligence Solutions at Microsoft Pavilion," PR Newswire, New York, Nov. 16, 1999, 4 pgs.

Davis, "Cognos Upgrades OLAP Client," Information Week, Manhasset, Issue 735, May 24, 1999, p. 40.

Faden, "Business Intelligence on Desktops," Information Week, Issue 790, Jun. 12, 2000, pp. 205-206, 208, 210.

GE 2001 Annual Report, available at www.ge.com/annual01/letter/cockpit as early as Dec. 10, 2007, 2 pgs.

Gillmor, et al., "Digital Dashboard Offers Little Light," Information Week, Issue 758, Oct. 25, 1999, pp. 85-86, 90.

Harreld, et al., "BI Commands Performance", InfoWorld, Issue 38, Sep. 23, 2002, pp. 1, 38-41.

Interview with GE CIO Gary Reiner, "Creating the Real-Time Manager", CIO Insight, vol. 1, Issue 20, Nov. 2, 2002, 3 pgs.

Jeng, et al., "An Agent-Based Architecture for Analyzing Business Processes of Real-Time Enterprises", Proceedings of 7th IEEE International Enterprise Distributed Object Computing Conference, 2003, 12 pgs.

Jennings, et al., "Agent-Based Business Management", available as early as Dec. 26, 2007, 26 pgs.

Jennings, "Using Intelligent Agents to Manage Business Processes", The Institution of Electrical Engineers, 1996, 3 pgs.

Lindorff, "Time =$", CIO Insight, New York, Nov. 2, 2002, vol. 1, Issue 20, p. 34 (6 pgs.).

Michael, "Test-Driving the Digital Dashboard", InfoWorld, vol. 22, Issue 19, May 8, 2002, pp. 81, 94.

Nadile, "Cognos Adds Data Mining", Information Week, Issue 617, Feb. 10, 1997, pp. 77, 2 pgs.

Raisinghani, et al., "An Automated Executive and Managerial Performance Monitoring, Measurement and Report System", Journal of Electronic Commerce Research, vol. 2, No. 1, 2001, pp. 23-31.

Ricadela, "Free Access to Business Data", Information Week, vol. 763, Nov. 29, 1999, pp. 85, 88.

Tedeschi, "Digital Cockpits Track a Corporation's Performance", The New York Times, Jul. 29, 2002, 3 pgs.

The Engineer, "The Front Office Revolution", The Engineer, Aug. 31, 2001, vol. 290, No. 7567, p. 11 (2 pgs.).

Tyndale, "A Taxonomy of Knowledge Mangement Software Tools: Origins and Applications", Evaluation and Program Planning 25, 2002, pp. 183-190.

Whiting, "Cognos Customizes Suite for J.D. Edwards Applications", Information Week, Issue 779, Mar. 27, 2000, p. 148, 2 pgs.

U.S. Appl. No. 10/339,166, filed Jan. 9, 2003, Johnson et al., entitled "Digital Cockpit."

U.S. Appl. No. 10/418,923, filed Apr. 18, 2003, Johnson et al., entitled "Visualizing Business Analysis Results."

U.S. Appl. No. 10/418,609, filed Apr. 18, 2003, Johnson et al., entitled "Controlling a Business Using a Business Information and Decisioning Control System."

U.S. Appl. No. 10/418,428, filed Apr. 18, 2003, LaComb et al., entitled "Development of a Model for Integration into a Business Intelligence System."

U.S. Appl. No. 10/418,339, filed Apr. 18, 2003, Johnson et al., entitled "Generating Business Analysis Results in Advance of a Request for the Results."

U.S. Appl. No. 10/418,928, filed Apr. 18, 2003, Johnson et al., entitled "Performing What-If Forecasting Using a Business Information and Decisioning Control System."

"Darwin Reference", Thinking Machines Corporation, Release 3.0.1, May 1998, pp. 1-20, 23, 47-51, 55, 69 81, 89-91, 96-97, 109-112.

* cited by examiner

TECHNIQUES FOR PERFORMING BUSINESS ANALYSIS BASED ON INCOMPLETE AND/OR STAGE-BASED DATA

BACKGROUND

This invention relates to automated techniques for performing business analysis, and more particularly, to computerized techniques for performing business predictions based on incomplete datasets and/or datasets derived from stage-based business operations.

Analysts commonly use a number of statistical techniques to provide accurate predictions regarding the likely course of manufacturing operations. The success of these techniques stems from a host of analytical-friendly factors associated with the manufacturing environment. For instance, manufacturing operations can generally be precisely described in mathematical terms. The economic aspects of the manufacturing environment are also generally well understood and can be precisely articulated. Further, a typical manufacturing environment provides a well-established technical infrastructure for recording salient parameters regarding the performance of the manufacturing operation. This infrastructure, coupled with the typically large amounts of data generated in a manufacturing operation, provides a rich historical database from which to derive accurate and robust statistical models for use in performing predictions.

Other fields are not so conducive to the development and application of accurate modeling techniques. For instance, analysts may have much greater difficulty developing and applying accurate analytical models in a "pure" business-related environment, such as a finance or service-related environment. This difficultly ensues from several factors. First, a business-related operation may be more difficult to precisely describe in mathematical terms compared to a manufacturing environment. This may be attributed to the fact that some of the metrics used in a business-related environment are inherently more "mushy" compared to parameters used in a manufacturing environment. This may also be due to difficulty in fitting mechanistic metaphors to a pure business operation, or due to difficulty in completely understanding (and thus modeling) complex relationships present in some business operations.

In addition, a business-related environment may not always maintain the kinds of data-rich archives found in manufacturing environments. This may be attributed in some cases to lack of suitable technical infrastructure for collecting operational data in business-related environments. In other cases, the failure to collect sufficient data may be attributed to the fact that the businesses have never collected certain kinds of information in the past, and thus the businesses may lack the kinds of cultures that encourage the regimented collection and archiving of such information. Deficiencies of this nature may result in one or more "holes" in the data that describes the past course of the business operation.

More significantly, a business may fail to collect enough data due to long cycle times found in many business environments (e.g., compared to manufacturing environments where an assembly line may quickly generate many products). The cycle time of a product refers the span of time required to completely process the product from a defined starting point to a defined termination point. For example, the cycle time of a loan approval process for a particular candidate may be defined by the span of time measured from an initial contact with the customer to a final approval and acceptance of a loan by the customer. These types of cycle times may span several days, several months, or even several years (e.g., for some complex commercial transactions). This may mean that a new business may operate for a lengthy period of time before it develops a sufficient amount of data to faithfully represent the full range of actions performed on an asset throughout its lifecycle. Incomplete datasets are referred to by various names in the art, such as "censored" datasets or "truncated" datasets. Censored data points are those whose measured properties are not known precisely, but are known to lie above or below some limiting sensitivity. Truncated data points are those which are missing from the sample altogether due to sensitivity limits.

The problem of incomplete datasets is particularly troublesome when developing and applying business models. This is because business models are typically developed to track the empirically-established history of a business operation. Accordingly, a model developed on the basis of an incomplete historical record may fail to properly characterize the business operation as a whole. For instance, a business operation may include plural stages that together span several months. If a business has only collected data for the initial stages of the operation, then a model developed from this data may not adequately describe the later stages of the operation.

In addition to the above-noted difficulties, the nature of the operations performed in a business-related environment may differ in significant ways from the operations performed in manufacturing environments. For instance, as noted above, some business-related operations are characterized by a series of discrete steps or stages performed in a predefined order. The above-described loan processing environment is illustrative of this kind of business operation. The loan approval process can be viewed as comprising a first stage of identifying a potential customer, a second stage of assessing the risk associated with providing a loan to the potential customer (as determined by an underwriter), a third stage of receiving feedback from the customer regarding the customer's acceptance or rejection of the offered loan terms and conditions, a fourth stage of issuing the loan to the customer, and so on. As appreciated by the inventors, the individual stages in a multi-stage process may differ in fundamental ways, yet have complex interrelationships that link these stages together. Thus, unlike more routine manufacturing environments, an analyst may have difficulty developing a single model that tracks and describes these divergent stages. Viewed in mathematical terms, an analyst may have difficultly finding a single equation that fits the "shape" of all of the stages in the business operation.

The negative consequences of the above-described difficulties can be significant. This is because predictions based on a faulty model will also be faulty. Reliance on faulty predictions can result in inappropriate decisions being made within the business, effectively steering the business in sub-optimal directions. Needless to say, such faulty guidance can have a negative economic impact on the business.

Techniques have been developed to address the problem of incomplete (e.g., censored) datasets. While these techniques work well with relatively small amounts of missing data, they begin to break down when a dataset contains larger amounts of missing data. Some business environments present scenarios in which the quantity of missing data approaches or even exceeds 50 percent of the total population of data that should have been collected. Traditional techniques cannot successfully handle datasets with this extent of missing data. Also, traditional techniques typically perform poorly in handling the stage-based data typically collected from stage-based business operations.

For at least the above-identified reasons, there is an exemplary need in the art to develop and apply more robust models that can be used in a business-related environment. There is a more particular need to develop and apply more effective models that specifically provide accurate analysis when exposed to incomplete datasets and/or datasets predicated on stage-based business operations.

SUMMARY

Techniques are described for performing business analysis based on datasets that are incomplete (e.g., contain censored data) and/or based on datasets that are derived from a stage-based business operation.

A first technique is described for performing business-related analysis based on an incomplete dataset. The first technique comprises: a) providing a model that is based on the incomplete dataset; b) generating a predicted value using the model, wherein the predicted value contains an error attributed to information that is missing from the incomplete dataset; c) performing a trending operation to derive a standardized score that pertains to a variance of the predicted value with respect to other predicted values in a specified time interval; and d) performing a de-trending operation to reduce the error in the predicted value based the standardized score calculated in the trending operation and a consideration of actual values associated with the specified time interval, the de-trending operation yielding an output result.

A second technique is described for performing business-related analysis with respect to a stage-based business operation. This technique comprises: (a) providing a business model that includes multiple sub-models, each sub-model being associated with a respective stage in the stage-based business operation; (b) performing analysis using a first sub-model provided by the business model based on a first collection of predictors to yield a first output result; and (c) performing analysis using a second sub-model provided by the business model based on a second collection of predictors to yield a second output result, wherein one of the second predictors in the second collection of predictors is the first output result provided by the first sub-model.

A third technique is described for providing information regarding when a specified event is likely to occur within a business. This technique comprises: (a) providing a business model that includes first, second, and third sub-models; (b) using the first sub-model to determine whether a specified asset is characterized as a type A asset or a type B asset, wherein: (b-i) the type A asset is an asset for which the specified event is relatively unlikely to occur, and (b-ii) the type B asset is an asset in which the specified event may or may not occur; (c) using the second sub-model to determine, if the specified asset is determined to be a type B asset, the probability that the specified event will occur for each of a plurality of specified time intervals; and (d) using the third sub-model to organize output results provide by the first and second sub-models, the organized output results conveying information that indicates whether the specified event is likely to occur for the specified asset, and if so, when it will occur.

Other techniques can combine one or more of the above-described three techniques.

Related apparatuses and computer readable media are also described.

Figure 1:
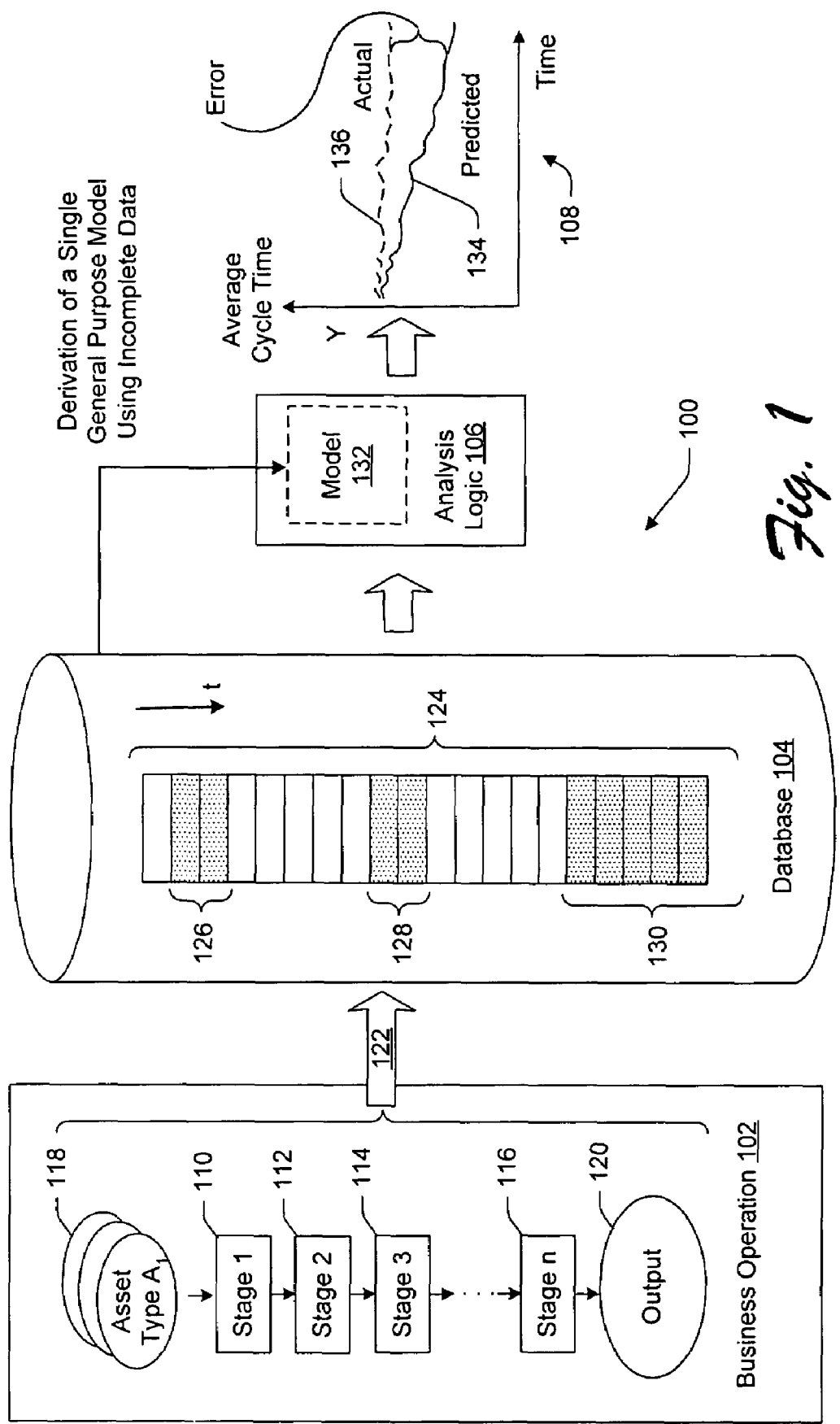
FIG. 1 shows a technique for processing an incomplete dataset in a stage-based business environment, and also shows resultant errors produced thereby.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure pertain to analysis performed in a business-related environment The term "business" has broad connotation. A business may refer to a conventional enterprise for providing goods or services for profit. The business may include a single entity, or a conglomerate entity comprising several different business groups or companies. Further, a business may include a chain of businesses formally or informally coupled through market forces to create economic value. The term "business" may also loosely refer to any organization, such as any non-profit organization, an academic organization, governmental organization, etc.

The business analysis can include various kinds of processing of business-related data. For example, the analysis can constitute formulating predictions that provide an indication of the likely course of a business operation. The analysis can also constitute organizing or summarizing past data in useful ways. These are merely two representative examples of the different types of analyses encompassed by the present disclosure.

Generally, the terms "predict" and "prediction" are used broadly in this disclosure. These terms encompass any kind of projection of "what may happen" given any kind of input assumptions. In one case, a user may generate a prediction by formulating a forecast based on the course of the business thus far in time. Here, the input assumption is defined by the actual course of the business. In another case, a user may generate a prediction by inputting a set of assumptions that could be present in the business (but which do not necessarily reflect the current state of the business), which prompts the system to generate a forecast of what may happen if these assumptions are realized. Here, the forecast assumes more of a hypothetical character (e.g., "If X is put into place, then Y is likely to happen").

The phrase "incomplete" datasets encompasses any kind of data deficiency. For example, an incomplete dataset may be deficient in that it contains missing fields of data. Such missing fields may be representative of time periods for which data was never collected or for which data has been subsequently lost or corrupted. Or such missing fields may be representative of subject matter topics for which data was never collected or for which data has been subsequently lost or corrupted. In terms of terminology used in the statistical arts, the incomplete dataset may encompass censored datasets and/or truncated datasets. Censored data points are those whose measured properties are not known precisely, but are known to lie above or below some limiting sensitivity. Truncated data points are those which are missing from the sample altogether due to sensitivity limits. This description of potential deficiencies is merely illustrative; other datasets may suffer from other kinds of deficiencies. Also, other datasets may include multiple different kinds of deficiencies.

This disclosure is organized as follows. Section A presents an overview of various techniques that can be used to analyze incomplete datasets and/or datasets representative of a stage-based business operation. Section B describes an exemplary technique for performing business analysis that rectifies the problems caused by incomplete datasets. Section C describes two exemplary techniques for performing business analysis using a multi-model approach. And Section D describes an exemplary architecture for implementing the techniques described in the preceding sections.

A. Overview of Techniques for Handling Incomplete and/or Stage-Based Datasets

Figure 2:
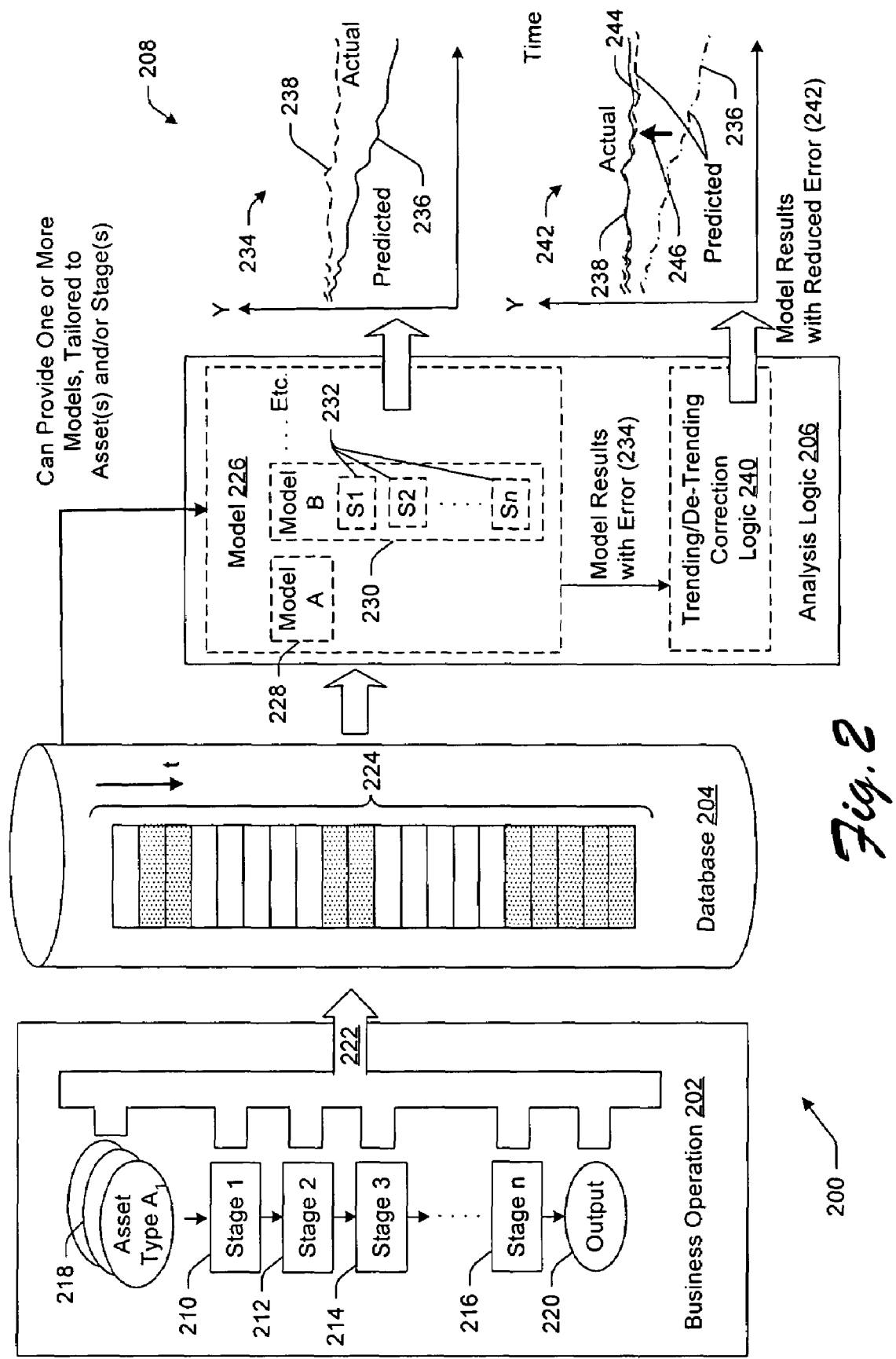
FIG. 2 shows an exemplary technique for processing an incomplete dataset in a stage-based business environment that effectively corrects the errors shown in FIG. 1.

The exemplary merits of the present invention can best be appreciated by making reference to an exemplary system that suffers from the kinds of problems mentioned in the Background section of the present disclosure. To this end, FIG. 1 shows a system 100 that processes business-related data in a suboptimal manner. The system 100 includes a representation of a multi-stage business operation 102, a database 104, and analysis logic 106 for processing data extracted from the database 104 to provide business analysis results 108. Each of these features will be described below in turn. Again, this figure is presently principally to highlight exemplary problems that may be encountered in processing business-related data. FIG. 2, to be described shortly, complements FIG. 1 by illustrating exemplary solutions to the problems shown in FIG. 1. (Further, it should be noted that the concepts illustrated with reference to FIG. 1 are culled from insights and conclusions reached by the present inventors in developing the instant invention; accordingly, the features shown in FIG. 1 are not to be construed as prior art).

To begin with, the business operation 102 includes multiple stages, e.g., stage 1 (110), stage 2 (112), stage 3 (114), and a generic last stage n (116). These stages can represent different phases in the processing of assets. In the example cited above, the different stage can represent different kinds of processing performed in the course of approving a loan. However, loan processing is merely an illustrative one of a myriad of different kinds of processes that can be characterized as multi-staged. In any case, the business operation 102 transforms an input asset 118 into some kind of finished output "product" 120. In the case of loan processing, an initial asset 118 may constitute a business lead that identifies one or more individuals who might be interested in purchasing a loan. The finished output product 120 might represent a finalized loan supplied to one of these individuals.

FIG. 1 specifically illustrates that the business operation 102 processes multiple different kinds of input assets 118. These different kinds of assets may be respectively representative of different groups of assets that share the same or similar features. In the case of loan processing, different asset types might refer to groups of individuals seeking loans that share similar attributes, such as similar industry affiliations. Different considerations may apply to different asset types depending on the unique attributes associated with these different asset groups.

Arrow 122 generally denotes the collection of data from the business operation 102 and the archiving of this data in the database 104. In conventional approaches, a business may collect a relatively meager amount of information that describes the business operation 102. Such information may reflect some of the attributes of the input assets 118 and an indication of the final disposition of the assets as reflected by the output 120. In traditional approaches, data that describes what is happening within the "body" of the business process 102 is not conventionally collected and processed. That is, while each stage (110, 112, 114, . . . 116) may be considered as producing a distinct output, conventional strategies do not extract information that reveals the outcomes of individual stages (110, 112, 114, . . . 116) in the overall process 102.

The database 104 itself contains a dataset 124 that can be considered incomplete. It can be regarded as incomplete due to many different kinds of data deficiencies, or combinations of different kinds of deficiencies. In the illustrative case of FIG. 1, the dataset 124 includes entries arranged according to time. This arrangement may reflect the time-based collection of data in the course of the business operation 102. The exemplary data deficiencies in the dataset 124 shown in FIG. 1 include missing data entries 126 and 128. These missing entries may indicate that data was never collected for some segment of time, or that the data has been subsequently lost or corrupted. The data deficiencies may also include a failure to include information for one or more later stages of a multi-stage business operation, such as business operation 102. A missing data span 130 reflects this phenomenon. For example, in the context of a loan processing application, the business might not have matured to the point where it has processed input assets 118 all the way through all of the stages of the business operation 102. In this case, missing data 130 reflects the information that will be collected when the business reaches its later stages, but is presently missing. These kinds of data deficiencies can be relatively severe in many business-related environments. It is not uncommon to see datasets that have over 50 percent of missing data (relatively to a potential complete population of data).

Alternatively, the business may have processed a first class of input assets all the way through the business operation 102, but may have not processed other kinds of assets all the way through the business operation 102. For instance, assume that a first class of assets represents passenger cars, while a second class of assets represents trucks. The business may have matured to the point where it has collected sufficient empirical data regarding the passenger cars, but not the trucks (because, for example, the trucks may have a longer cycle time associated therewith). In this case, the missing data 130 may represent a lack of data describing certain asset types.

The analysis logic 106 includes a model 132 used to process the data stored in database 104 in some prescribed manner. The model 132 can use a great variety of known techniques to process the data, including, but not limited to, general linear modeling techniques, regression analysis techniques, time series analyses, artificial intelligence analyses, and so on. More generally, the model 132 can be configured to provide a predictive function. That is, the model 132 can receive an indication of what has happened in the business operation 102 over a span of time, and based thereon, can predict what is likely to happen in the business operation 102 in the future.

In general terms, a model can be viewed as providing a transfer function that maps a set of input parameters (X's) into one or more output parameters (Y's). In one implementation, the transfer function, ƒ( . . . ), provides the mapping functionality defined by the following equation:

$$Y=f(c_1X_1, c_2X_2, c_3X_3, \ldots c_nX_n) \quad (1)$$

where Y is an output parameter provided by the transfer function, $X_1$-$X_n$ represent input parameters fed to the transfer function that influence its output Y, and $c_1$-$c_n$ represent coefficients (e.g., constants) that modify the input parameters. The precise mathematical transformation provided by the transfer function will vary depending on the business environment in which the business logic 106 is employed.

In any case, the model 132 should accurately represent the business operation 102. To this end, the model 132 is conventionally developed such that it describes the behavior of the business operation 102 as reflected by the data in the dataset 124 that has been extracted from the business operation 102. In another words, the dataset 124 can be viewed as a training set that informs the model 132 of the behavior of the business operation 102. A model 132 based on a robust dataset will likely successfully capture the salient characteristics of the business operation 102. However, the dataset 124 shown in FIG. 1 includes the deficiencies described above. The consequence of this is that the model 132 may fail to accurately characterize the business operation 102. For instance, if the data stored in the database 104 does not represent later stages in the business operation 102, then the model may perform well in describing the initial stages of the business operation 102, but it may fail to describe the later stages. Alternatively, if the data stored in the database 104 only represents certain classes of input assets 118, then the subsequently developed model 132 may do a good job in providing predictions for that set, but not others.

The business results 108 show the deleterious impact of a model 132 that does not adequately represented the business operation 102. That is, the business results 108 map an output parameter Y (average cycle time) with respect to time. Cycle time refers to the length of time required to process a product through the business operation 102 from start to finish, e.g., from stage 1 (110) to stage n (116). Line 134 denotes the predictions generated by the model 132. Dashed line 136 denotes what the ideal results should look like. For instance, dashed line 136 may represent the actual results that were measured in the course of the business operation 102. Note that the predicted output 134 significantly deviates from the actual output 136, and, in this particular example, the predicted output 134 moves progressively farther away the actual results 136 as a function of time. This particular phenomenon may reflect the fact the model 132 was developed based on the earlier stages of the business process 102, but not the later stages. Or this phenomenon may reflect the fact the model 132 was developed based on asset types for which information has already been obtained (such as passenger cars), but not other asset types for which information has not yet been obtained (because, for instance, the corresponding assets have not yet completed their cycle times (such as might be the case with trucks compared to passenger cars).

It can immediately be appreciated that the predictions represented by line 134 are unsatisfactory for use in projecting the course of the business operation 102, particularly for those stages and/or assets that are not well-represented by the model 132 (corresponding to those parts of the business results 108 that depart most dramatically from the actual values 136).

Another deficiency in the business results 108 may reflect shortcomings in the paradigm used to construct the model 132. More specifically, the business operation 102 is shown as including multiple stages (e.g., stages 110, 112, 114, . . . 116), as discussed above. Yet a traditional approach is to develop a single general purpose model to globally represent all aspects of the business operation. In one illustrative case, for example, an analyst may attempt to develop a single transfer function that globally fits the multi-stage business operation 102 as if it was a unitary whole. Yet it may be difficult or impossible to hope to devise a single model 132 that accurately accounts for the multifaceted nature of some multi-staged business operations 102. And as a result of this difficulty, a single model 132 may perform poorly in representing all of the different aspects of the business operation 102. The result, again, is suboptimal business results 108.

FIG. 2 shows an overview of a system 200 for addressing some of the problems shown in FIG. 1. The system 200 includes a business operation 202 that feeds data into a database 204. Analysis logic 206 processes the data extracted from the database 204 to provide business results 208. Like the case in FIG. 1, the business operation 202 includes multiple stages (210, 212, 214, . . . 216). The business operation 202 accepts assets 218 for input. The assets 218 may correspond to one or more classes of asset types. The business process 202 generates an output product 220.

The solution represented by FIG. 2 addresses the problems shown in FIG. 1 in the following manner. First, the system 200 typically provides a more fine-grained extraction of historical data from the business operation 202 compared to the case of FIG. 1. That is, whereas the system 100 in FIG. 1 only extracted information regarding the input parameters and output parameters of the business operation 102 as a whole, the system 200 shown in FIG. 2 also extracts salient information regarding what happens within the "body" of business operation 202, including its intermediary steps. For instance, the system 200 might extract information regarding the outcomes of stages 210, 212, 214, and 216 of the business operation 202. The system 200 may also extract information regarding the range of asset types 218 input to the business operation 202, as well as the nature of the output of the business operation 202 reflected by its output 220. Generally, multi-pronged arrow 222 reflects the fine-grained extraction of data from the business operation 202. This fine-grained data is used to construct a dataset 224 which is stored in the database 204. However, like the case of FIG. 1, this dataset 224 may contain incomplete data of the nature described above in connection with FIG. 1.

The system 200 includes modified analysis logic 206 for more efficiently processing the incomplete dataset 224 compared to the case of FIG. 1. Exemplary principal aspects of the solution provided by the analysis logic 206 are shown in FIG. 2. Later figures delve into these principal aspects in a more detailed fashion.

To begin with, the analysis logic 206 is generically shown as including a model 226 that may include multiple components sub-models. While any number and type of sub-models can be included, model 226 can include exemplary sub-model A (228), exemplary sub-model B (230), and so on. In one implementation, exemplary sub-model B (230) can itself include multiple sub-models 232 associated therewith. The sub-models 232 can be respectively tailored to model respective stages (210, 212, 214 ... 216) of the business operation 202. That is, each of the sub-models 232 can include a different analytical paradigm (e.g., transfer function) that is specifically tailored to model the operations performed within an individual stage (210, 212, 214, ... 216) of the business operation 202. The different transfer functions may accept different respective collections of input parameters X's and provide different output parameters Y's. Further, an output parameter Y of a sub-model may serve as an input parameter X supplied to another "downstream" sub-model. Hence, sub-model B (230) can be considered recursive, meaning that the conclusions reached by one sub-model can serve as an input considerations applied to another sub-model. Further, sub-model B (230) can be considered dynamic in that the input parameters (X's) and/or constants (c's) used therein can vary depending on a particular input asset class 218 being processing, or based on a particular stage being processed, or based on a particular intermediary result generated by the sub-model 230, or based on any other factor (such as time or drifting population conditions). Additional details regarding the use of multiple stage-based sub-models are presented in Section C below.

In another implementation, the analysis logic 206 also has the capacity to apply different sub-models to different groupings of data collected from the business operation 202. For instance, the analysis logic 206 can apply sub-model A (228) to address a first class of input assets 218 and sub-model B (230) to address a second class of input assets 218. For instance, the analysis logic 206 can apply sub-model A to discriminate between loans that will go fill term (that is, without being paid off early by their customers) and loans that have some appreciable potential of being paid off early. Sub-model A can use logistic regression to perform this task. The analysis logic 206 can then apply sub-model B to provide further analysis of those loans that are determined to have some potential of being paid off early, such as by providing information regarding when the respective customers are likely to pay off their loans. Sub-model B can use survival analysis to perform this task. Addition details regarding the above-described techniques are also provided in Section C of this disclosure.

The output of the model 226 should provide more accurate predictions compared to the model 132 shown in FIG. 1. This is because the model 226 does not attempt to shoehorn a complex and possibly multi-stage business operation 202 into a single all-purpose model (as is the case of model 132 shown in FIG. 1). Instead, the model 226 provides separate component sub-models for addressing different stages, thus locally fitting the behavior of the resultant collective model 0.226 to individual parts of the business process 202. In other words, assume that the behavior of the business operation 202 can be characterized using the metaphor of multiple local line segments. The analysis logic 206 shown in FIG. 2 attempts to fit separate equations (sub-models) to individual line segments, rather than attempting to shoehorn the entire collection of line segments into a single mathematical function. At the same time, the analysis logic 206 attempts to preserve the linking between line segments by feeding information generated by one line segment into other linked line segments. The result of the solution shown in FIG. 2 is modeling results 234 that potentially provide a much closer fit to the actual behavior of the business operation 202 compared to the case of FIG. 1.

Nevertheless, because the analysis logic 206 must work with the incomplete dataset 224, its business results 234 may still provide suboptimal predictions. Namely, line 236 represents the predicted output generated by the model 226. The predictions represented by line 236 deviate from the ideal (e.g., the actual) results 238 in a similar manner to that described in FIG. 1, although perhaps not to the same extent. Namely, assume that the dataset 224 only represents the initial stages of the multi-stage business operation 202, or that the dataset 224 only represents certain asset types that have completed their cycle times so far. In this case, the line 236 representative of the predicted results can be expected to progressively diverge from the expected results 238, as shown in the business results 234. In other words, the business results 234 are overemphasizing those assets or stages described by the dataset 224, while underemphasizing those assets or stages that are omitted from the dataset 224.

The analysis logic 206 addresses the above-described problem by providing trending/de-trending correction logic 240 (referred to as "correction logic" 240 for brevity below). By way of overview, the correction logic 240 shifts and scales the predicted results (represented by line 236) so that it generally tracks the ideal or actual results (represented by line 238). In the particular example shown in FIG. 2, this has the effect of moving line 236 upward until it generally "lies over" line 238. A corrected business results plot 242 shown in FIG. 2 illustrates the correction performed by the correction logic 240. In this plot 242, the position of line 236 after it is moved upward to meet line 238 is represented by line 244. The movement of line 236 is itself denoted by arrow 246. Stated more generally, the transformation represented by arrow 246 has the effect of mapping the local variations present in line 236 onto the general path taken by line 238. Stated yet another general way, the transformation represented by arrow 246 has the effect of correcting the general bias in line 236 so as to match the general bias of line 238. By virtue of this process, the correction logic 240 basically confirms the general shape of the line 236 as being valid; the correction logic 240 corrects this line 236 by only moving and scaling it as required.

One way to perform the above-described shifting and scaling is using a two-phase approach. In a first phase, the correction logic 240 trends a prediction using a collection of predicted results provided by the model 226 with respect to a specified period of time. In a second phase, the correction logic 240 de-trends the prediction using the results of the trending operation as well as a collection of actual values with respect to the specified period time. Section B (below) provides additional details regarding the operation of the correction logic 240.

The joint effect of the partitioned modeling provided by model 226 and the trending/de-trending provided by the correction logic 240 overcomes many of the challenges and deficiencies noted above with respect to FIG. 1. Exemplary details of the above-described features are presented in the following sections.

B. Trending and De-Trending to Offset the Effects of an Incomplete Dataset

FIGS. 3-6 illustrate exemplary particulars of the trending and de-trending performed by the correction logic 240 shown in FIG. 2. The trending and de-trending are described here in the context of exemplary mathematical equations involving the computation of means, standard deviations, and Z score values. However, other techniques can be developed to perform the same kind of correction illustrated by arrow 246 of FIG. 2.

The correction logic 240 can be applied to address the problem of incomplete datasets in any kind of business environment. But to facilitate discussion, the correction logic 240 will be described in the context of one particular exemplary business environment—namely, the leasing of vehicles. In this environment, a leasing business leases vehicles, such as passenger cars and/or trucks, to customers. The customers use the vehicles for a certain amount of time and then return the vehicles to the business at the end of this time. The period of time between a customer's initial receipt of a leased vehicle and the customer's return of the vehicle defines the "cycle time" of that leased vehicle. Because customers lease the vehicles for various purposes that are not immediately known to the leasing business, the leasing business does not have precise knowledge of when the customers will return their vehicles. Thus, in order to efficiently manage their resources, the leasing business may attempt to predict when the customers might be returning their vehicles.

Models developed to perform the above-described cycle time prediction in a leasing environment may have to deal with incomplete datasets of the type described with respect to FIGS. 1 and 2 above. For instance, a leasing operation in a commercial context can involve the leasing of cars for several months or even several years. Accordingly, if the leasing business is a relatively new venture (or has embarked on a relatively new leasing program) it may not have yet collected sufficient historical records to describe the full cycle time of previously leased vehicles.

Figure 3:
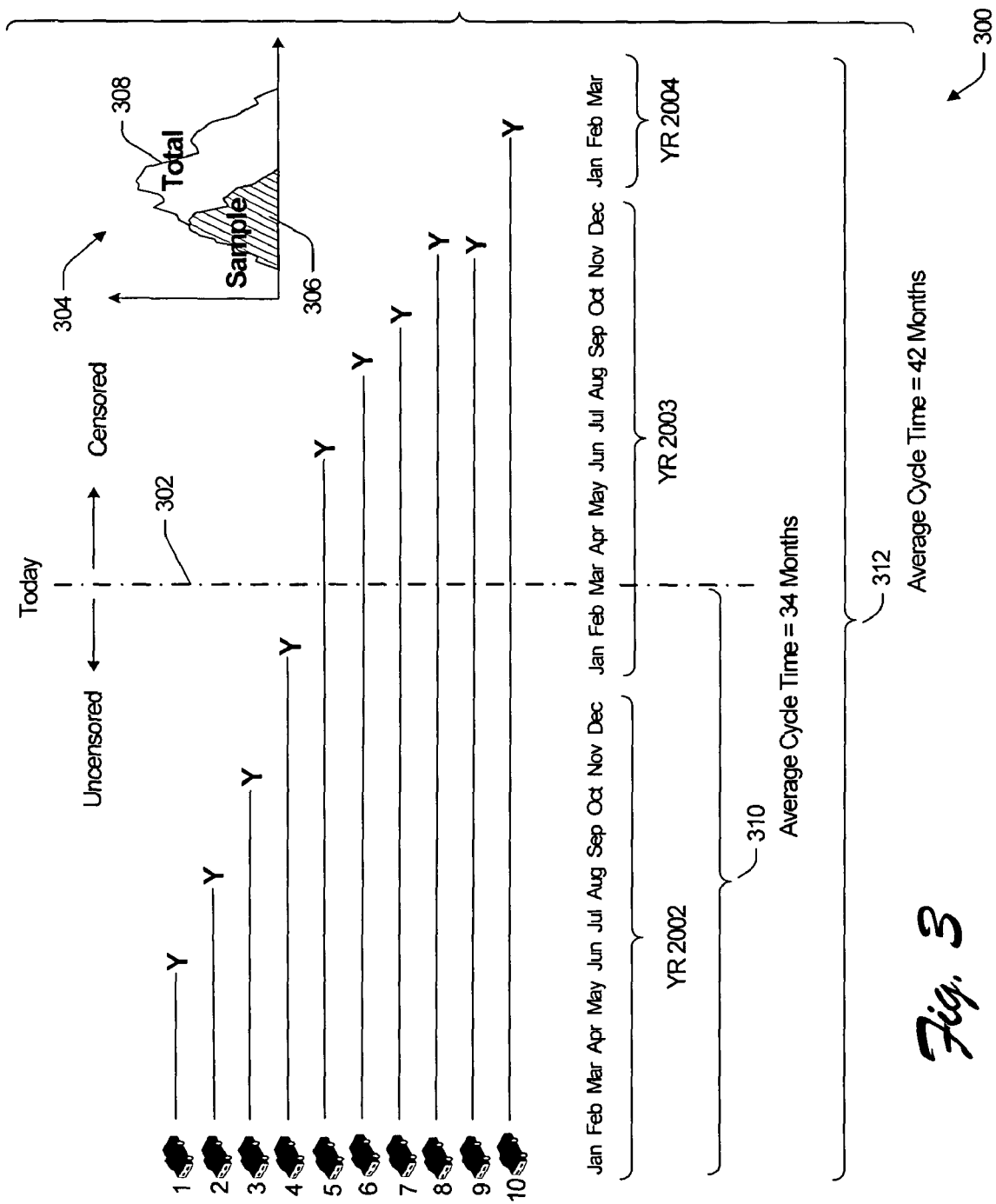
FIG. 3 shows an example of an incomplete dataset in the context of a car leasing business operation.

FIG. 3 presents a scenario 300 that illustrate the above-described problem in the context of a leasing business. In this scenario 300, the leasing business has leased an entire population of ten vehicles (labeled vehicles 1-10 along the left margin of the figure). The horizontal span of the figure represents progressing time (from left to right). Vertical line 302 represents a current point in time. Accordingly, data points to the left of the line 302 represent what has happened in the past in the business, while data points to the right of the line 302 represent what will happen in the future (which, of course, is unknown, but is represented as a collection of discrete events of fixed timing to facilitate discussion).

In the above scenario 300, vehicles 1-4 have been returned by their respective customers. In the parlance of a leasing business, these vehicles thus have "off-road" status. Vehicles 5-10 have yet to be returned by their respective customers. These vehicles have "on-road" status. This means that the database 204 that logs salient information regarding the course of the leasing business will only include data that reflects the complete cycle times of vehicles 1-4. It will not include information pertaining to vehicles 5-10 because these vehicles are still on the road, figuratively speaking.

As a result of the relative paucity of information in the database 204, a model developed from the dataset 224 may perform well when describing the behavior of vehicles 1-4, but is likely to perform poorly when predicting the behavior of vehicles 5-10. This deficiency may result in a disparity in the quality of predictions provided for different classes of vehicles. For example, assume that vehicles 1-4 are passenger cars, while vehicles 5-10 are trucks. The model would provide accurate predictions for the passenger cars, but not for the trucks. This phenomenon can manifest itself in the drooping line 236 (representative of predictions generated by the model 226) relative to the relatively horizontal line 238 (representative of actual values observed in the business).

Graph 304 represents another way to illustrate the above-described data deficiency in the database 204. Sample plot ("Sample") 306 in the graph 304 represents archived data for only those vehicles that have been returned. Total population plot ("Total") 308 represents the characteristics of the entire population of leased vehicles, many of which have not been returned as of the indicated present time 302. Note that the sample plot 306 does not include all of the detail of the total plot 308, and is therefore an imperfect replica thereof. That is, the shape of the sample plot 306 differs from the shape of total plot 308 in some respects. This means that the sample plot 306, by itself, cannot provide a reliable prediction of what will happen to the entire population of leased vehicles (represented by total plot 308). Still another way of describing this phenomenon is by noting that an analyst would come to conclusion that the average cycle time for the leased vehicles is, for example, 34 months based on the four cars that have gone off-road as of the present time 302. Time span 310 is used to compute this average. However, had the analyst waited until all of the vehicles went off-road, then the analyst would have computed the average cycle time to be the more accurate 42 months (for example). Time span 312 is used to compute this more accurate average.

Figure 4:
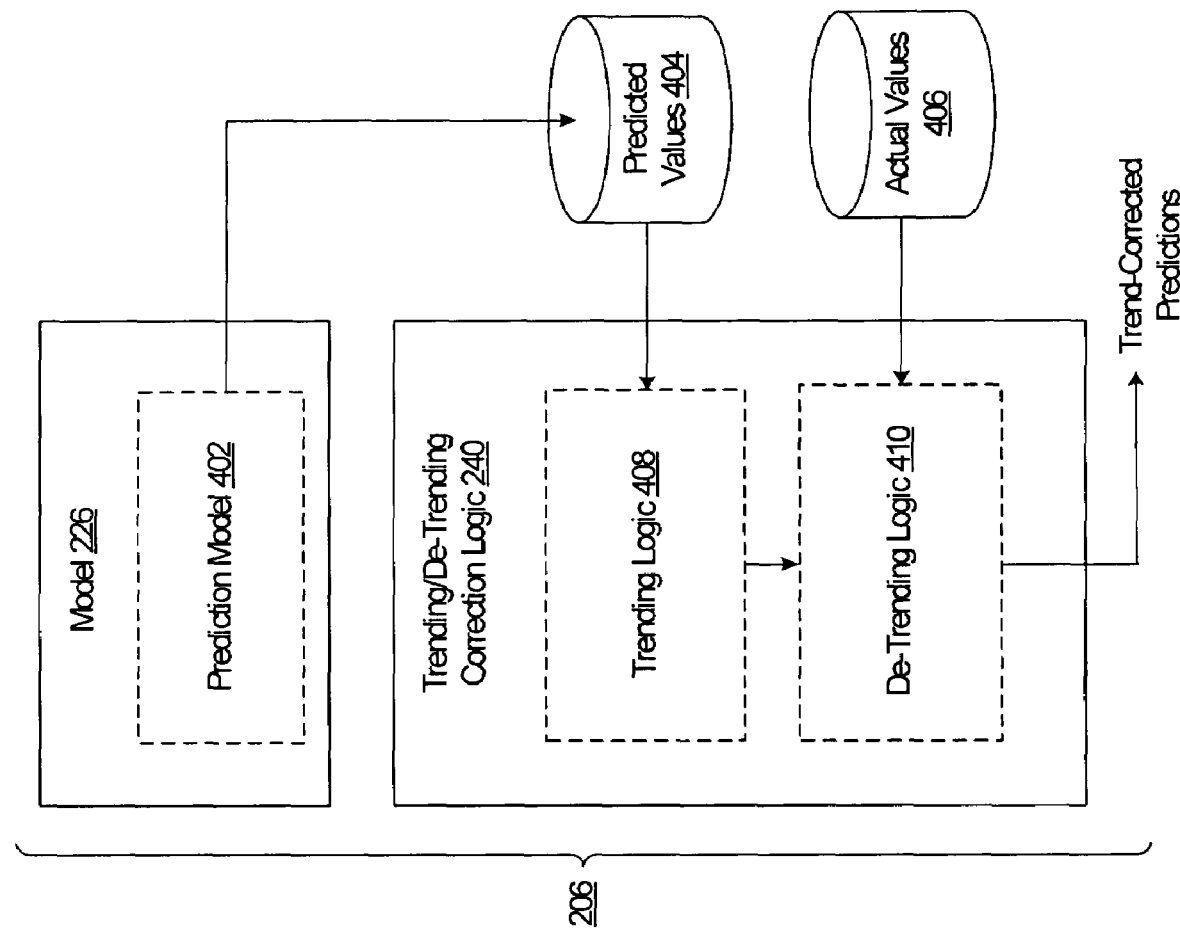
FIG. 4 shows exemplary logic for correcting errors caused by the processing of an incomplete data set for use in the technique shown in FIG. 2.

FIG. 4 shows exemplary logic used to address data deficiencies of the type described above. More specifically, this figure shows the analysis logic 206 including the model 226 and correction logic 240 introduced in the context of FIG. 2. The model 226 specifically includes at least one prediction model 402 for providing predicted values. In the context of a leasing operation, the prediction model 402 provides values that describe the projected cycle times of the leased vehicles. The prediction model 402 stores its output in a predicted values database 404. The predicted values database 404 can comprise a part of the database 204 shown in FIG. 2, or can comprise a separate storage mechanism. FIG. 4 also shows an actual values database 406. The actual values database 406 stores data regarding the actual observed course of the business operation 202 (representative of the data extracted via arrow 222 shown in FIG. 2). Alternatively, or in addition, the actual values database 406 can store data that is derived from the actual observed values, such as by extrapolating or otherwise extending statistical measures derived from these actual observed values. The database 406 can also form a part of the database 204, or can be implemented as a separate storage mechanism.

The correction logic 240 includes trending logic 408 and de-trending logic 410. The trending logic 408 computes a Z score on the basis of predicted values generated by the model 402 and stored in the predicted values database 408. The de-trending logic 410 computes a corrected prediction based on the Z score computed by the trending logic 408 and the actual values stored in the actual values database 406. The output of the correction logic 240 represents business results that have been corrected for the deficiencies in the incomplete dataset 224.

The trending operation provided by trending logic 408 can be represented by the equation:

$$Z \text{ score} = \frac{Y_p - \text{mean of predicted values}}{\text{predicted } \sigma} \quad (2)$$

where the "Z score" represents a Z score of a predicted value, "$Y_p$" represents a predicted value for a vehicle of interest at a time "$t_i$" (a time of interest), "mean of predicted values" represents the mean of predicted values in a time period "T" that encompasses the time of interest $t_i$, and "predicted $\sigma$" represents the standard deviation of predicted values in the time period T.

The de-trending operation provided by de-trending logic 410 can be represented by the equation:

De-Trended Value=(Z score*actual σ)+mean of actual values   (3)

where "De-Trended Value" represents the predicted $Y_p$ value after it has been corrected to account for the bias of the incomplete dataset 224, "Z score" represents the Z score value calculated in equation (2), "actual a" represents the standard deviation of actual values in the time period T, and "mean of actual values" represents the average of the actual values in the time period T.

Figure 5:
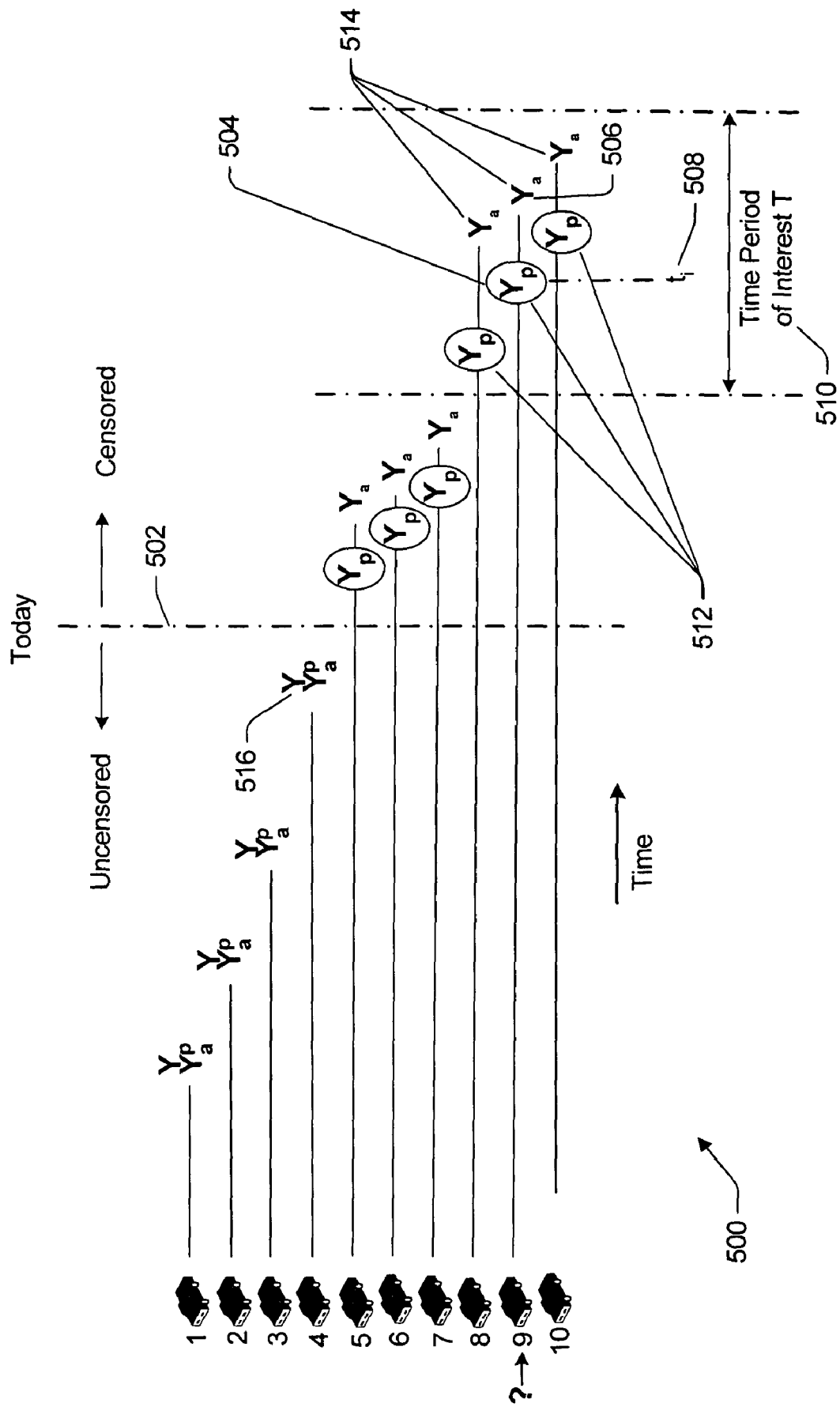
FIG. 5 shows the application of the logic shown in FIG. 4 to an exemplary incomplete dataset in the context of a car leasing business operation.

FIG. 5 shows the meaning of the above-identified variables for a particular example in a vehicle leasing business. More specifically, FIG. 5 shows a scenario 500 that is generally based on the scenario 300 shown in FIG. 3. In FIG. 5, a vertical line 502 represents the present time. This vertical line 502 therefore divides the horizontal time axis into the past, for which a collection of actual vehicle cycle times-are known (e.g., for vehicles 1-4), and the future, for which the actual vehicle cycle times are not yet known (e.g., for vehicles 5-10). The small representative sampling of 10 vehicles is merely illustrative; in actuality, the entire population is expected to preferably include many more vehicles.

Suppose that an analyst is interested in predicted when vehicle 9 will come off road. To compute this cycle time value, the analyst can apply equation (2) implemented by the trending logic 408, followed by equation (3) implemented by the de-trending logic 410. First, the analyst can use the prediction model 402 to compute a predicted cycle time value $Y_p$ (504) that indicates when vehicle 9 is predicted to come off-road (where the subscript "p" denotes "predicted"). $Y_p$ (504) is shown in FIG. 5 as occurring sooner than an actual cycle time value $Y_a$ (506). That is, $Y_a$ (506) indicates when vehicle 9 will actually come off-road (where the subscript "a" denotes "actual") (that is, $Y_a$ may represent an actual observed value at some time after the present time denoted by line 502). The lag time between $Y_p$ (504) and $Y_a$ (506) is due to the above-described effect of under-representing long cycle time vehicles in the dataset 224.

$Y_p$ (504) is determined to occur at a time of interest, $t_i$, (508). The above-mentioned time period "T" (510) corresponds to a period of time centered around or otherwise encompassing the time of interest $t_i$ (508). For example, the time period T (510) may correspond to one or more months centered at the time of interest $t_i$ (508). More generally, the time period T (510) can be selected to suit the processing needs of a particular business environment.

To compute the Z score using equation (2), the trending logic 408 computes the mean of a collection of $Y_p$'s within the time period T (510). In FIG. 5, this collection corresponds to a predicted grouping 512. All of the values in the grouping 512 are computed by the prediction model 402. The predicted a is formed by computing the standard deviation of the predicted grouping 512. The resultant computed Z score conceptually represents how many standard deviations $Y_p$ (504) lies away from the mean of the predicted grouping 512.

The de-trending logic 410 uses equation (3) to compute a bias-corrected value of $Y_p$ (504) for vehicle 9. To perform this task, the de-trending logic 410 multiplies the Z score computed in equation (2) by the actual a, where the actual a describes the standard deviation of a collection of actual values $Y_a$'s in time period T (510). That is, in this example, the actual σ is representative of the standard deviation of a collection of actual $Y_a$'s in an actual grouping 514. Finally, the thus-computed product of the Z score and actual σ is added to a value representative of the mean of the $Y_a$'s within the actual grouping 514.

For example, assume that vehicles 8, 9 and 10 in the predicted grouping 512 represent a certain class of vehicles, such as trucks of a certain type. Accordingly, the Z score computed for vehicle 9 effectively represents the extent to which the predicted cycle time $Y_p$ (504) for vehicle 9 varies with respect to the values in predicted grouping 512. However, the prediction model 402 has "placed" the predicted grouping 512 in the "wrong location" along the time axis due to the presence of censored data in the database 204. The second equation (3) applied by the de-trending logic 410 effectively determines where to properly re-position the predicted value $Y_p$ (504) based on statistical measures representative of the $Y_a$'s in the actual grouping 514 and on the basis of the Z score computed in equation (2). These operations will have the effect of correcting the value of $Y_p$ (504) so that it lies within the collection of $Y_a$'s associated with the actual grouping 514.

In this example, the $Y_a$'s in the actual grouping 514 represent events that will happen in the future. Thus, at the present time indicated by vertical line 502, these $Y_a$'s are not known. Because of this, an approximation technique is used to compute the "actual σ" and the "mean of actual values" variables that are required by the de-trending equation (3). In one implementation, these actual mean and standard deviation values are computed based on the existing population of actual observed values. For instance, the mean and standard deviation of $Y_a$'s in the actual grouping 514 can be computed by extrapolating the actual observed means and standard deviations of $Y_a$'s associated with vehicles 14. Alternatively, the actual mean and standard deviation for grouping 514 of $Y_a$'s can be formed by extending a most current actual mean and standard deviation computed on the basis of actual observed $Y_a$'s. For example, the actual mean for grouping 514 can be formed by using the actual observed mean associated with vehicle 4 (which, in this case, may not produce good results due to the distribution of actual values in this particular example).

When the above-described corrections are performed for multiple vehicles, the correction illustrated by the arrow 246 shown in FIG. 2 is achieved. More specifically, recall that plot 242 shows average cycle times (on the vertical axis) with respect to time (on the horizontal axis). The above-described corrections performed by the trending logic 408 and the de-trending logic 410 can effectively move the uncorrected average cycle time line 236 up so that it generally tracks the actual average cycle time line 238.

Figure 6:
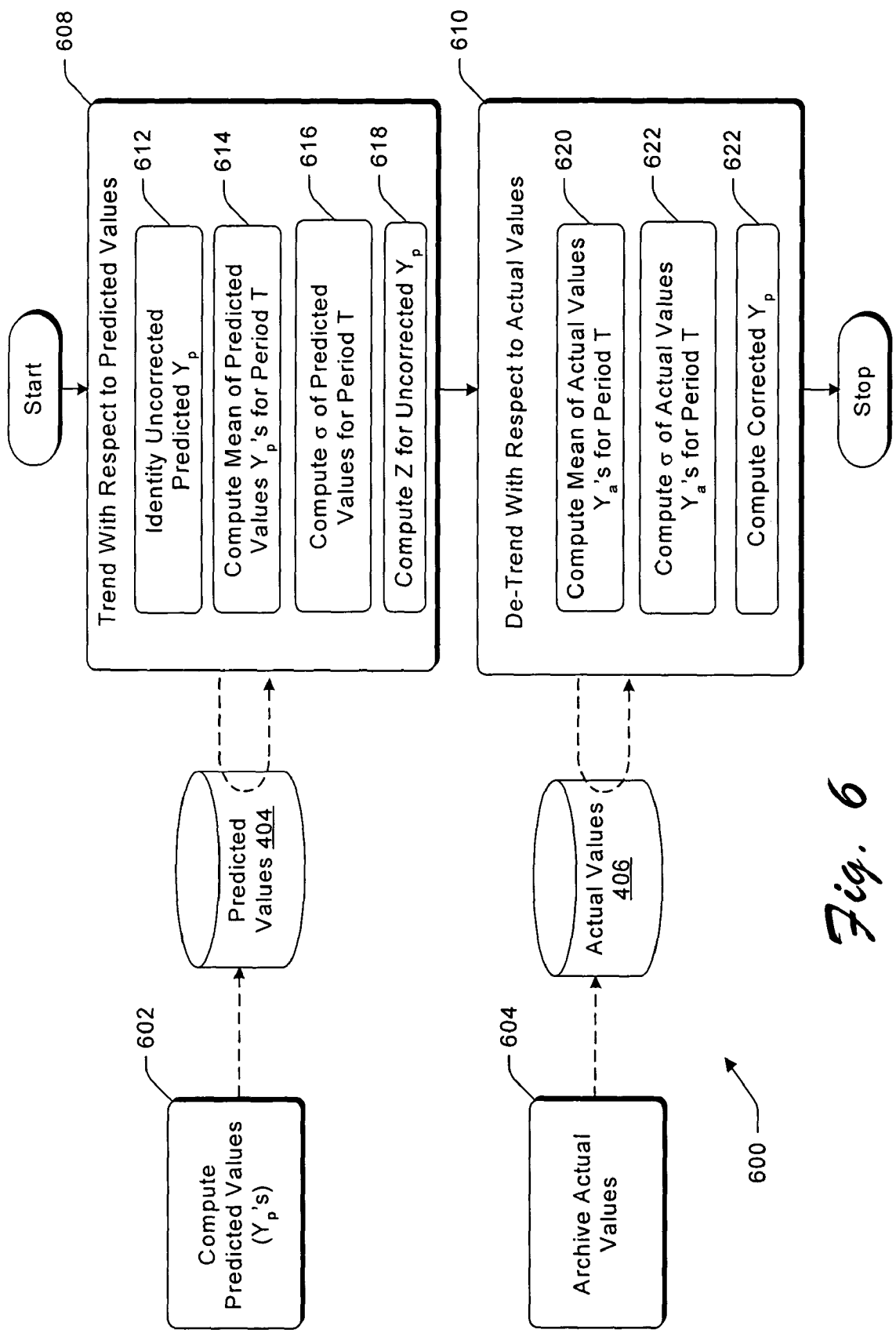
FIG. 6 shows a procedure for carrying out the functions executed by the logic shown in FIG. 4.

FIG. 6 shows a technique 600 for executing the above-described operations in flowchart form. More specifically, the right side of FIG. 6 shows a sequence of steps used to implement the above two equations (2, 3). The left side of FIG. 6 shows a series of steps used to provide information used in the steps shown on the right side of FIG. 6.

To begin with, step 602 entails calculating predicted values $Y_p$'s using the prediction model 402. The prediction model 402 is derived on the basis of the incomplete dataset 224, and therefore may have a tendency to emphasize short cycle assets at the expense of long cycle assets. The predicted values are stored in the predicted values database 404.

Step 604 entails archiving actual values observed in the course of the business operation 202 and storing these values in the actual values database 406. For example, when a vehicle is returned to the business, a cycle time that reflects the total amount of time that the vehicle has been "on the road" can be computed. This measured (or observed) cycle time constitutes a so-called actual value ($Y_a$).

The trending and de-trending operations are performed in steps 608 and 610, respectively. Assume, as stated before, that the analyst is interested in computing the cycle time Y for a particular vehicle that is currently off-road. Step 612 entails identifying an uncorrected predicted value $Y_p$ computed by the prediction model 402 for this particular vehicle of interest. This $Y_p$ will occur at a time of interest $t_i$. A time period T is selected to encompass the time of interest $t_i$. T can define a period of one or more months in one exemplary application.

Step 614 entails computing the mean (average) of the predicted $Y_p$'s within the period T. Step 616 entails computing the predicted standard deviation σ corresponding to the dispersion of the $Y_p$'s within the period T. And step 618 entails computing the Z Score on the basis of the information collected in steps 612, 614, and 616 using equation (2) discussed above.

The de-trending component 610 of the procedure 600 includes step 620, which entails computing the mean of actual values $Y_a$'s in the period T. Step 622 entails computing the actual standard deviation σ on the basis of $Y_a$'s in the period T. If the time period T contains actual observed $Y_a$'s, then steps 620 and 622 compute the actual mean and standard deviation based on these actual observed $Y_a$'s. However, if these values do not exist, then the actual mean and standard deviation can be approximated based on an existing population of $Y_a$'s This approximation may specifically entail extrapolating a collection of actual observed means and standard deviations (derived from actual observed values) into the future to provide reasonable guesses for means and standard deviations likely to be observed in the future. Alternatively, this approximation may entail simply extending the most current actual observed mean and standard deviation into the future. Still other techniques can be used to provide or compute actual means and standard deviations. Finally, step 624 entails computing the corrected value $Y_p$ for the vehicle of interest using equation (3) on the basis of the results collected in steps 618, 620, and 622.

Again, the specific series of operations and computations shown in FIG. 6 is exemplary. Other operations and computations can be used to affect the same type of shifting and scaling of predicted results to address the problem of an incomplete dataset In any event, the procedure 600 shown in FIG. 6 has the significant merit of being able to provide accurate predictions even in the presence of relatively large amounts of missing data For instance, the procedure 600 can provide accurate results even in those environments that have 50 percent or more of missing data (relative to a total population of data that might have been collected by the business operation 202). The procedure 600 may also work in even more data-challenged environments. As described above, traditional techniques for dealing with censored data do not successfully address the heavy censoring found in these kinds of environments. The procedure 600 thus allows a business to make intelligent decisions regarding its future even when it lacks a robust archive that describes the history of its business operation.

C. Analyzing a Dataset Using a Partitioned Model Paradigm

Another aspect of the solution provided by analysis logic 206 is its ability to provide business analysis using plural sub-models. As described in the overview Section A, the analysis logic 206 can employ different sub-models to address different classes of assets 218 processed by the business operation 202. Alternatively, or in addition, the business logic 206 can employ different models or sub-models to provide separate analysis for individual stages (210, 212, 214, ... 216) included in the business operation 202. A variety of techniques can be provided that embody the above-described general partitioned model paradigm. The following two subsections (i.e., C.1 and C.2) present details regarding two exemplary such techniques. These two techniques can be used separately, or in combination.

C. 1. Analyzing Datasets Using a Dynamic Recursive Technique

Figure 7:
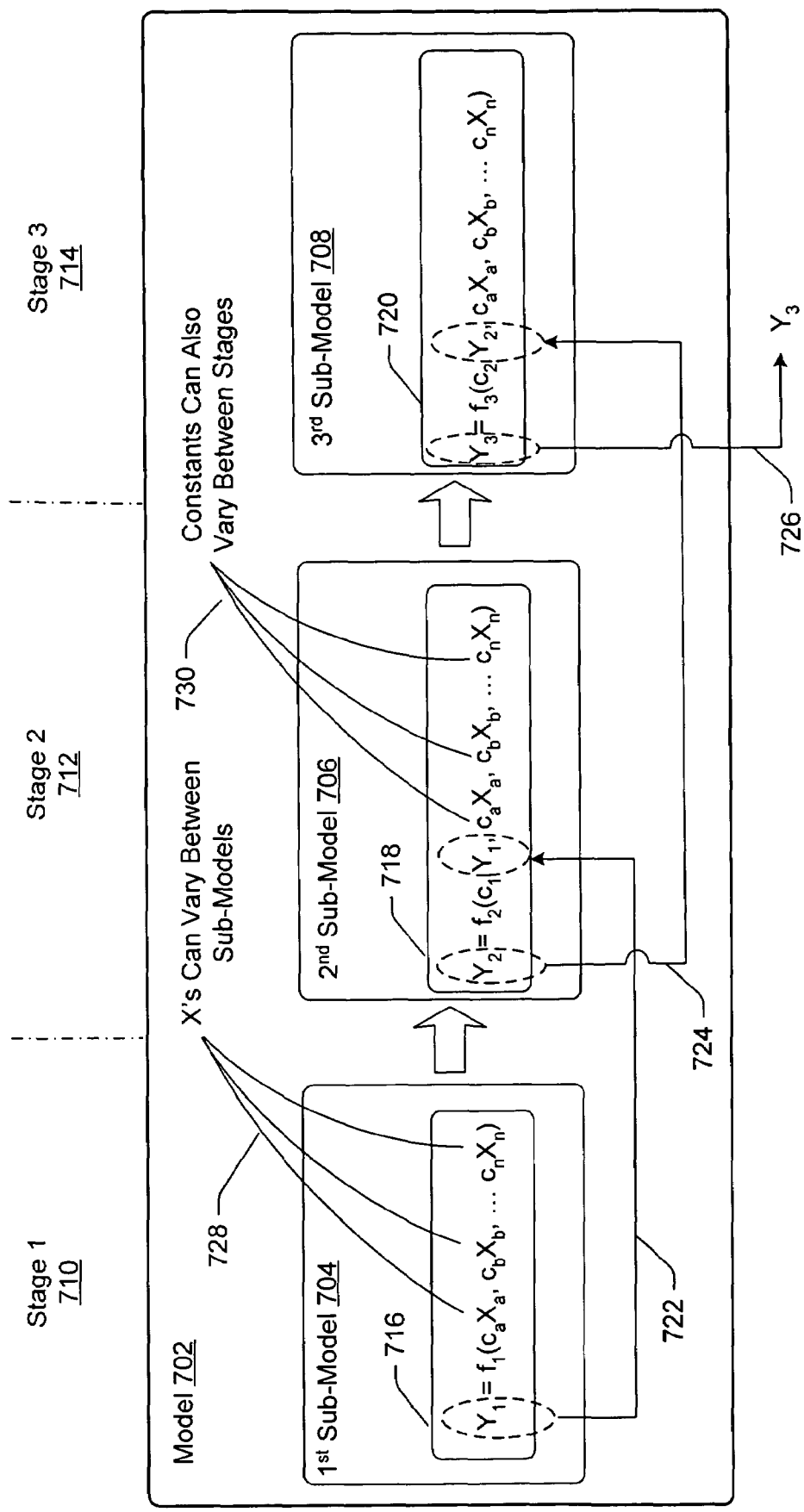
FIG. 7 shows logic for processing a dataset produced by a stage-based business operation for use in the technique shown in FIG. 2.

FIG. 7 shows a model 702 used to perform stage-based prediction within the analysis logic 206 shown in FIG. 2. That is, model 702 is an implementation of general model 226 shown in FIG. 2. The model 702 includes three exemplary sub-models—that is, sub-models 704, 706, and 708. First sub-model 704 provides analysis associated with a first stage 710 of a business operation, second sub-model 706 provides analysis associated with a second stage 712 of the business operation, and third sub-model 708 provides analysis associated with a third stage 714 of a business operation. The illustration of three sub-models (704, 706, 708) and corresponding stages (710, 712, 714) is merely exemplary; more than or fewer than three sub-models and associated stages can be included depending on the nature of the underlying business operation being modeled.

Each of the sub-models includes a transfer function that characterizes its input-output mapping behavior, or which otherwise includes functionality that can be characterized using the metaphor of a transfer function. That is, the first sub-model 704 includes transfer function 716, the second sub-model 706 includes transfer function 718, and the third sub-model 718 includes transfer function 720. The exemplary transfer function 716 for the first sub-model 704 can be represented by the equation:

$$Y_1 = f_1(c_a X_a, c_b X_b, c_c X_c, \ldots c_n X_n) \quad (4)$$

where $Y_1$ is an output parameter produced by the first transfer function 716, $f_1$ represents the mapping operation performed by the first transfer function 716, $X_a$-$Y_n$ represent input parameters fed to the first transfer function 716, and $c_a$-$c_n$ represent coefficients (e.g., constants) that modify the input parameters. The precise mathematical transformation provided by the transfer function 716 will vary depending on the business environment in which the analysis logic 206 is employed. In the context of a deal-based business environment, $Y_1$ may represent a "product" produced by a first stage in the processing of a deal, such as some type of initial approval, etc. Likewise, the specific nature of the X's and c's used in the transfer function 716 will vary depending on the operations in the first stage 710 that are being modeling using the transfer function 716. Generally, the input parameter X's will capture the salient parameters that have been empirically or mathematically shown to have an influence on the output variable $Y_1$.

The second transfer function 718 can be expressed as:

$$Y_2 = f_2(c_1 Y_1, c_a X_a, c_b X_b, \ldots c_n X_n) \quad (5)$$

where $Y_2$ is an output parameter produced by the second transfer function 718, $f_2$ represents the operation performed by the second transfer function 718, $Y_1$ represents an output parameter produced by the first transfer function 716 (employed here as an input parameter), $c_1$ represents a constant which modifies the output parameter $Y_1$, $X_a$-$X_n$ represent input parameters fed to the second transfer function 718, and $c_a$-$c_n$ represent constants that modify the input parameters.

Of particular interest in the second transfer function 718 is its use of the output parameter $Y_1$ of the first transfer function 716 as an input parameter, as if it was just another input parameter X. Stated in broader conceptual terms, equation (5) identified above indicates that the output parameter $Y_1$ of the first transfer function 716 has a bearing on the output parameter $Y_2$ of the second transfer function 718. For example, in a loan-based business application, the output parameter $Y_1$ may reflect a probability of the deal passing the first stage 710. For instance, this first stage 710 might involve an initial consideration of the risks associated with a candidate that desires a loan This probability $Y_1$ also has a bearing on the probability of the deal progressing through the second stage 712. According, the output parameter $Y_1$ is properly identified as an input parameter in the second transfer function 718. Line 722 represents the use of the output parameter $Y_1$ of the first transfer function 716 as an input parameter in the second transfer function 718.

For convenience of explanation, the second transfer function 718 is shown as including the same X's as the first transfer function 716. However, the X's used in different transfer functions can be expected to vary, as different factors may be relevant to different stages in predicting the Y's associated with these different stages. Likewise, for convenience of explanation, the second transfer function 718 is shown as including the same constants (c's) as the first transfer function 716. Again, however, the c's used in different transfer functions can be expected to vary. For instance, an input X associated with "worker experience level" might be applicable to stage 1 (710), but not stage 2 (712). Alternatively, the input X associated with experience level might be applicable to both the first and second stages (710, 712), but this input X might have a much greater impact on the outcome of stage 1 (710) compared to stage 2 (712). Accordingly, in this example, the constants that modify (or scale) this input X value may vary from stage 1 (710) to stage 2 (712). Generally speaking, the use of the output of one transfer function as an input to another transfer function contributes to the recursive behavior of the model 702. The ability to change c's and X's over different stages contributes to the dynamic nature of the model 702. Combining these attributes together, the model can be considered as exhibiting dynamic-recursive behavior.

Later sub-models in the model 702 can provide the same inventive features as the second sub-model 706. For instance, the third transfer function 720 of the third sub-model 708 can be described using the following equation:

$$Y_3 = f_3(c_2 Y_2, c_a X_a, c_b X_b, \ldots c_n X_n) \quad (6)$$

where $Y_3$ is an output parameter produced by the third transfer function 720, $f_3$ represents the operation performed by the second transfer function 720, $Y_2$ represents an output parameter produced by the second transfer function 718 (employed here as an input parameter), $c_2$ represents a constant which modifies the output parameter $Y_2$, $X_a$-$X_n$ represent input parameters fed to the third transfer function 720, and $c_a$-$c_n$ represent constants that modify the input parameters.

Again note that the one of the input parameters (e.g., $Y_2$) of the third transfer function 720 is also the output parameter of the second transfer function 718. Although not shown, the third transfer function 720 might have also included the output parameter $Y_1$ of the first transfer function 716 as an input parameter had it been determined that this parameter was relevant to the output $Y_3$ of the third transfer function 720. Line 724 represents the use of the output parameter $Y_2$ as an input parameter in the third transfer function 720. Line 726 represents the output of the result $Y_3$ as the final output of the model 702. In a deal-based business context, the final output $Y_3$ may be representative of the ultimate success for failure of the loan process with respect to a particular candidate. Lines 728 and 730 point to commentary on the dynamic variation of X's and c's in the model 702 as a function of stage, as described above.

Figure 8:
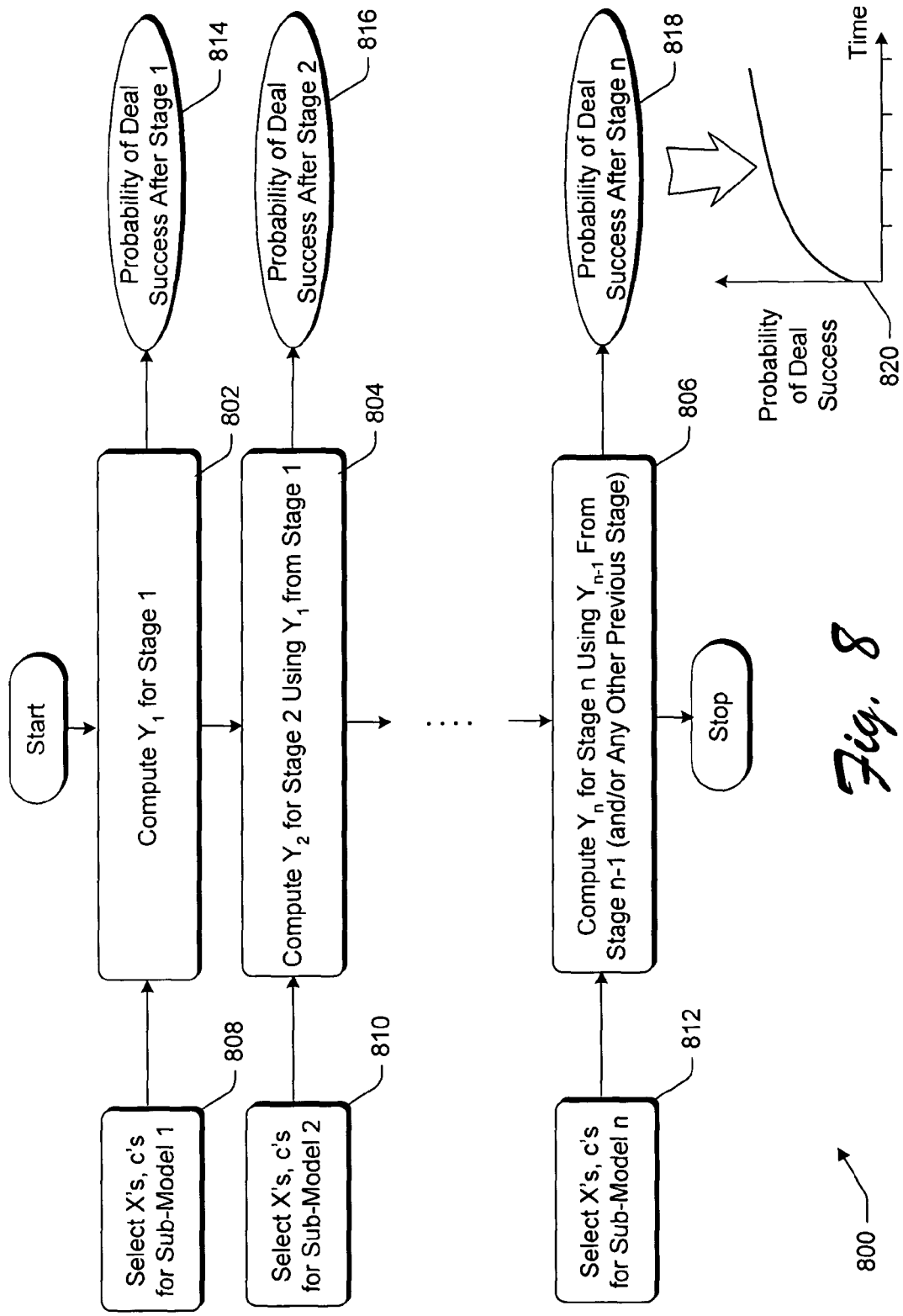
FIG. 8 shows a procedure for carrying out the functions executed by the logic shown in FIG. 7.

FIG. 8 illustrates the concepts shown in FIG. 7 in flowchart form. The procedure 800 shown in this figure includes step 802 which entails computing an output parameter $Y_1$ associated with a first stage of a multi-stage process. The procedure then includes a step 804 of computing an output parameter $Y_2$ for a second stage based on, at least in part, the output parameter $Y_1$ of stage 1. The procedure can sequence through any number of stages and associated computations in this manner. Step 806 generally represents the last of a series of stage-based computations. In this step 806, an output parameter $Y_n$ is computed based, at least in part, on the output parameter of one or more preceding stages (e.g., based on the output of an immediately proceeding stage, e.g., $Y_{n-1}$). The output parameter $Y_n$ of the last step 806 is the ultimate output of the model 806.

As noted above, the model 702 can alter the selection of constants (c's) and input parameters (X's) as a function of stage. Step 808 generally indicates the selection of appropriate X's and c's for a first sub-model, where the selection of X's and c's governs the processing performed in step 802. Step 810 generally indicates the selection of appropriate X's and c's for a second sub-model, where the selection of X's and c's governs the processing performed in step 804. And step 812 generally indicates the selection of appropriate X's and c's for an nth sub-model, where the selection of X's and c's governs the processing performed in step 806.

As mentioned above, the final output of the procedure 800 shown in FIG. 8 is the output of the last step 806. However, the procedure can also provide the analyst with the local outputs of intermediary steps (e.g., steps 802, 804, etc.). This intermediary information can be considered valuable for various reasons. In one case, a stage-based business operation may have a relatively long cycle time associated therewith, such as several months, or perhaps even several years. In this case, the procedure 800 can provide information regarding the preliminary outcomes of intermediary stages in the process with respect to assets with yet undetermined cycle times (because the business is still processing the assets). Providing intermediary results will therefore allow an analyst to make intelligent business decisions based on the assessed progress of the business operation thus far. In addition, the procedure 800 can provide intermediary output results even for those assets that have been successively processed through all of the stages in the business operation. This intermediary information gives the analyst some idea of the behavior of the business operation as a whole, and, in particular, how the success or failure of one stage may influence other "downstream" stages. This information is useful in gleaning a better understanding of the business that is being modeled, which again allows the analyst to make more informed decisions regarding the course of the business.

More specifically, in one example, each of the steps in the procedure 800 can generate information that reflects the evolving probability that the deal will succeed. This probability information is denoted by the ovals 814, 816, and 818 shown in FIG. 8, which are respectively associated with the assessed probability of success of the three stages within the business operation. Information gleaned in this manner can be plotted to reveal various trends within the business process. For instance, graph 820 plots the probability of deal success with respect to time (or stage). As indicated there, in one business environment, the probability of deal success increases the longer the deal has been in the processing "pipeline."

As mentioned above, the stage-based strategy shown in FIGS. 7 and 8 can be applied to a variety of business-related applications. Additional details regarding an exemplary loan-related application will be provided in the following discussion.

In a typical loan processing application, one or more initial stages in a multi-stage deal-based business operation can be devoted to identifying customers that are likely to need loans and/or might qualify for such loans. This determination might entail examining a database containing information regarding a relatively large pool of potential customers and culling out a specific set of candidates therefrom for further processing. This culling can be based on various identified factors indicating the suitability of the candidates for loan processing. A next stage of the loan approval process might entail contacting these customers and describing the financial products offered by the lending business to the customers. In alternative applications, this stage might entail the initial processing of customers who independently contact the business to explore the possibility of receiving loans. As one might expect, the X's applicable to these initial stages may vary widely depending on the specific nature of the business context. In one particular environment, relevant X's in the initial stages of loan processing might include: a) the characteristics of the business agent who originates contact with a potential customer (e.g., pertaining his or her skill in dealing with customers and explaining financial products to the customers); b) the geographic region in which the transaction is initiated; c) the size and/or composition of a team assigned the task of initially handling the loan transaction (which might be relevant particularly in the case of large and complex commercial transactions); d) the experience of the individuals assigned the task of initially handling the transaction; e) the asset class associated with the transaction (such as the type of loan sought by a customer, or the "type" of customer seeking the loan), and so on. Again, a myriad of such X factors can be identified based on the empirically or mathematically established interrelationships pertinent to a particular business environment. The output of the initial stages of the loan processing operation may present a metric $Y_1$ that indicates whether or not it is feasible to continue processing a loan transaction with respect to a particular potential customer. The output of initial stages might also include various related metrics which characterize the attributes of the potential customer, the loan being sought, and so on.

Having passed the initial stages, a loan transaction may advance to intermediary stages in the loan approval process. Such intermediary stage may entail conducting formal risk assessment of the loan transaction by skilled underwriters. Different X's may have a bearing on whether a candidate passes these stages of loan approval. Common X parameters might include the credit rating of the candidate, the assets already possessed by the customer, the amount of money sought by the candidate, and so on. Importantly, the outcome of the initial stages $Y_1$ may also be a relevant predictor in the outcome $Y_2$ of the underwriting-associated intermediary stages. Accordingly, along with the above identified X's regarding the characteristics of the candidate, the transfer function(s) provided by the intermediary stages may also accept the output parameter $Y_1$ produced in the initial stages as a relevant predictor of success in the intermediary stages.

Generally, the intermediary stages may rely on one or more new X's (i.e., X's that were not used in the initial stages). The intermediary stages may also discontinue the use of certain X's that were used in the initial stages. Or still yet, the intermediary stages may use some of the same X's as the initial stages, yet may weight these X's differently than the initial stages (which can be accomplished by adjusting the constants which modify these common X's). The ability to change X's and c's over different stages contributes to the dynamic nature of the technique.

Providing that a loan is actually offered to a candidate, another stage can be provided to analyze the considerations that weigh upon whether the candidate will actually accept the terms of the offered loan. Again, different X's and c's may go into making this determination depending on the specific nature of the business environment and the characteristics of the candidate. And once again, the output parameters ($Y_1$, $Y_2$, etc.) of earlier stages may also be relevant predictors of success in these later stages.

Still additional stages can be included in the loan processing procedure. For instance, providing that the candidate accepts the loan, one or more stages can be included to actually administer a loan payment program.

The use of multiple sub-models respectively tailored to individual operations in a complex transaction may produce more accurate overall modeling results (compared to the conventional use of one transfer function to model the entire complex transaction). The recursive transfer of parameters between sub-models also has the potential of producing more accurate output results. The dynamic variation of c's an X's as a function of stage has the potential of tailoring the analysis performed by the business operation to the specific characteristics of different stages of the business operation, and thus has the potential of further improving the accuracy of the predicted results. Still additional merits of the above-described stage-based analysis of a business operation will be apparent to those skilled in the art.

C.2. Combining "Whether" and "When"-Type Analyses

Figure 9:
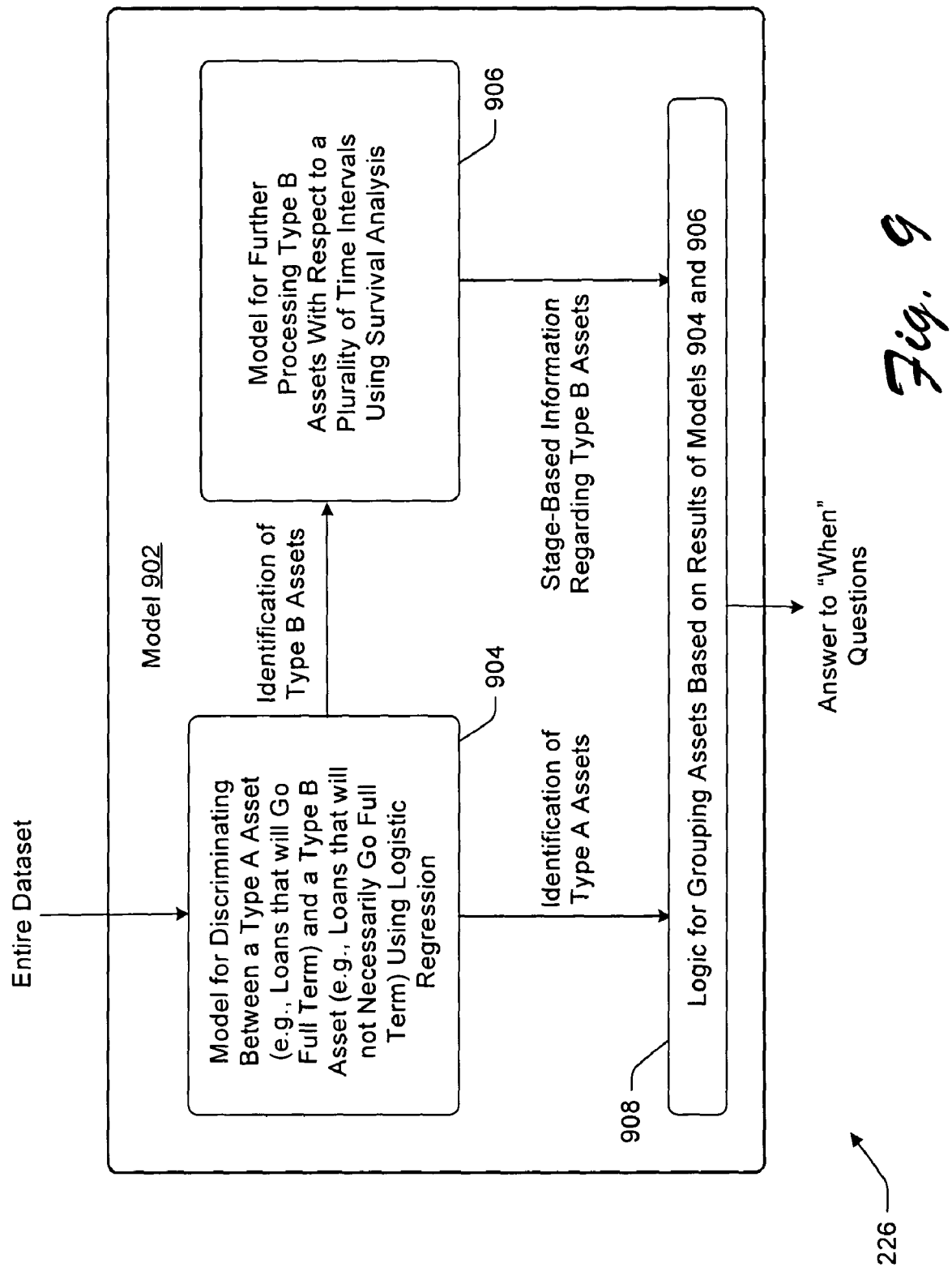
FIG. 9 shows logic for processing a dataset to provide information regarding when a specified event is likely to occur.
Figure 10:
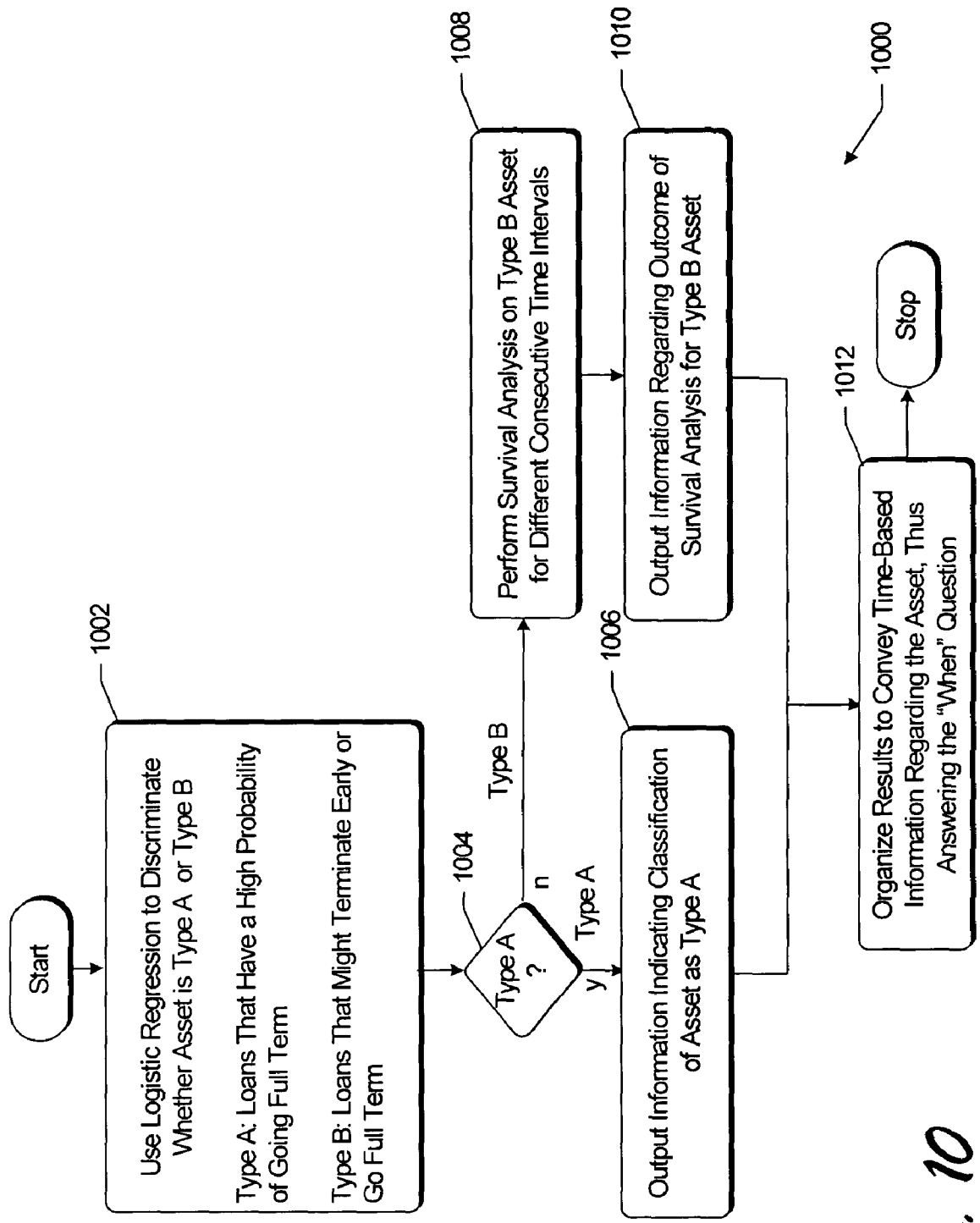
FIG. 10 shows a procedure for carrying out the functions executed by the logic shown in FIG. 9.
Figure 11:
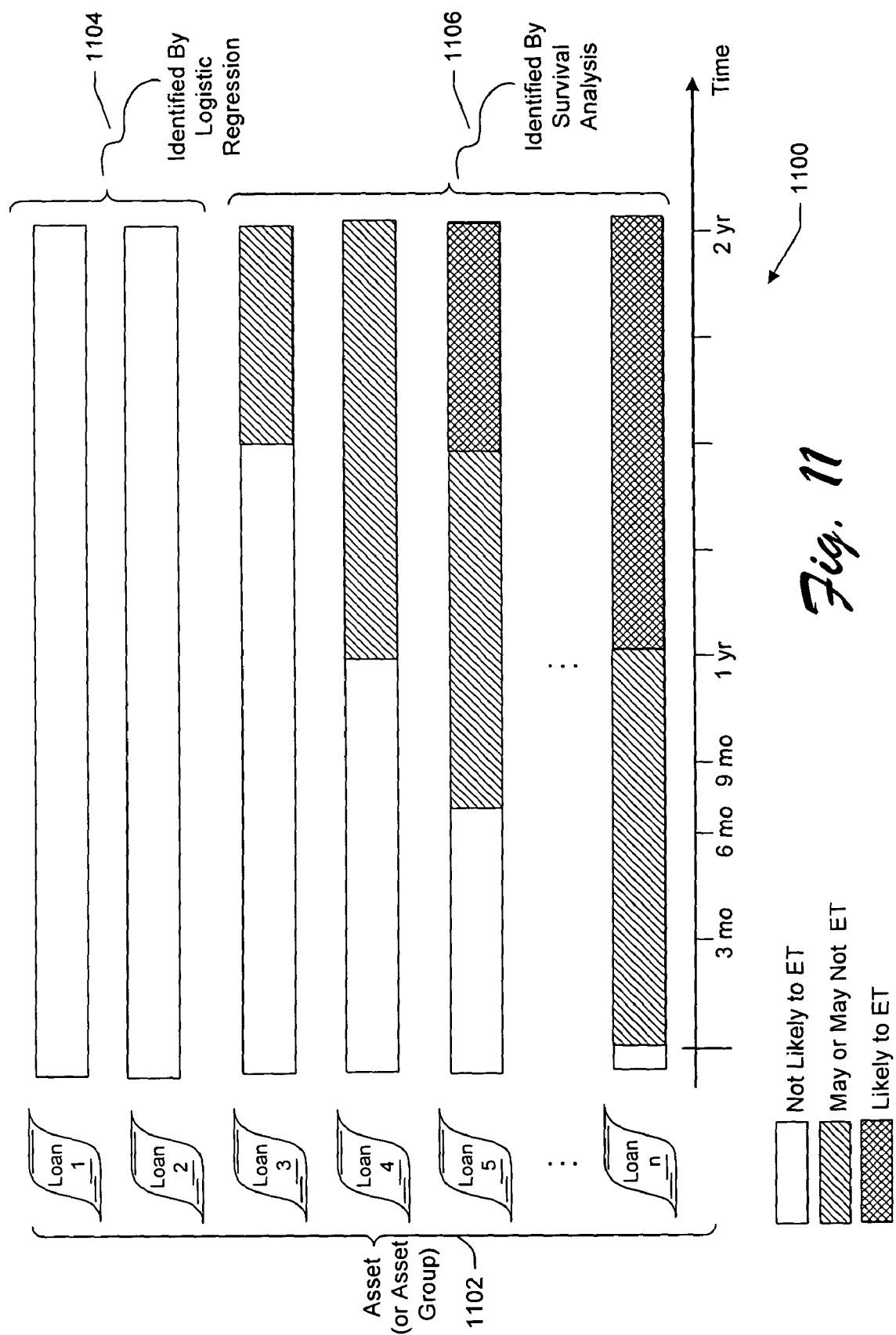
FIG. 11 shows an exemplary graphical output of the procedure shown in FIG. 10.

FIGS. 9-11 describe another technique that falls under the general rubric of multi-partitioned model processing. In this case, a collection of disparate sub-models is used to ultimately answer the question of when a particular event will transpire within a business. To provide a concrete framework for discussion, the "when" question will be discussed in the context of loan processing. More specifically, when a loan is issued to a customer, it is useful to the lending institution to know when the customer is going to finish paying off the loan (e.g., when the customer is going to make the last payment on the loan and thus terminate the loan). A loan will typically have a fill term associated therewith, such as 5, 10, 15, or 30 years, etc. A customer traditionally is given the option of making regular payments to eventually pay the loan off in the allotted full term. Alternatively, the customer may opt to pay the loan off earlier than the specified full term date. A lender may generally find that the former category of full term loans are more profitable to it compared to the latter category of early termination loans. This is because, when customer pays of a loan early, the lender foregoes interest payments that would have been provided to it on a periodic basis. And it is for this reason that a financial institution might want to predict the payment behavior of its loan-holders—e.g., in order to better predict and plan for ebbs and flows of revenue received through its loan programs. A financial institution might be particularly interested in predicting those loans that will be paid off very quickly, e.g., in a few months. This is because these loans will earn the financial institution very little money—perhaps so little as to not recoup the costs associated with granting a loan to the customer. Accordingly, a financial institution might actually lose money on these loans, and thus has an active interest in predicting when these types of early termination events might take place.

The strategy illustrated in FIG. 9 uses a model 902 that includes multiple sub-models to answer the "when" question in various respective stages of analysis. A first sub-model 904 processes the entire dataset (such as dataset 224) and discriminates between different general asset types. Stated in generic terms, the first sub-model 904 can discriminate whether an asset under consideration is either a type A asset or a type B asset. More specifically, in a loan processing environment, a type A asset can correspond to loans that have a high probability of going full term. A type B asset can correspond to all other loans, meaning loans that may go full term, but may also terminate early. Accordingly, a type B asset corresponds to loans that at least have some appreciable probability of terminating early. The first sub-model 904 thus answers a preliminary binary question of "whether"—that is, it answers the question of whether or not an asset is a type A asset or a type B asset, corresponding respectively to loans that will very likely go full term and loans that have some appreciable probability of terminating early (although which may also go full term). One type of technique that can be used to answer the "whether" question is logistic regression.

Another sub-model 906 performs further analysis on type B assets—that is, those assets that have some probability of terminating early. This sub-model 906 specifically examines each of the type B assets for a series of consecutive segments of time. It then decides, for each type B asset, the probability that some event will transpire within each of the time segments. More specifically, in the context of loan processing, the sub-model 906 can examine each loan for a plurality of consecutive time intervals (e.g., 3 months, 6 months, 9 months, one year, two years, three years, etc.). The sub-model 906 can then assign a probability that the loan will terminate within each time interval. This probabilistic information would provide some indication of relative risks of termination for each of the plurality of time segments. One technique that can be used to perform this analysis is survival analysis.

The stage-based logic employed in the sub-model 906 can also employ the recursive functionality described in Section C.1. For example, the probability of a loan terminating in a first period might also serve as a valuable input predictor in determining whether the loan will terminate in a subsequent time period. According, sub-model 906 can itself include multiple sub-models that implement different modeling paradigms in the manner described above with respect to FIGS. 7 and 8; that is, the Y's of one or more of the sub-models can feed into one or more other sub-models as input X's to potentially improve the accuracy of prediction provided by the model as a whole.

Finally, logic 908 is used to organize the assets into groups depending on the results of the sub-models 904 and 906. In one implementation, logic 908 performs this task by organizing the assets into three different groups depending on the likelihood that the assets will terminate early. A first group identifies those assets that have a relatively high probability of going full term. A third group identifies those assets that have a relatively high probability of terminating early. And a second group identifies those assets that have probabilities of termination that lie somewhere between the first and third groups; that is, the second group identifies those assets that have a some appreciable probability of either going full term or terminating early. In terms of color coding, the color green might be assigned to those assets in the first group (that have a high probability of going full term), the color red might be assigned to those assets in the third group (that have a high probability terminating early), and the color yellow might be assigned to those assets in the second group (that have neither a strong possibility of going fill term or terminating early). This tripartite classification can furthermore be performed with respect to each of the above-identified segments of time (e.g., 3 months, 6 months, 9 months, 1 year, 2 years, etc.). One technique that can be used to perform the above-described grouping operation is cluster analysis. As those skilled in the art will appreciate, the concepts discussed in connection with FIG. 9 can be extended to provide additional time-based probabilistic gradations (that is, more than three gradations).

FIG. 10 illustrates the operations discussed in connection with FIG. 9 in flowchart form. The procedure 1000 shown there includes an initial step 1002 of using logistic regression to discriminate whether an asset under consideration is either a type A or type B asset. As discussed above, in the exemplary setting of loan processing, a type A asset represents an asset that has a significant probability of going full term. A type B asset constitutes an asset that will not necessary go full term—that is, which has some probability of going full term or terminating early. Step 1004 formally provides branching between two different paths depending the outcome of the analysis provided in step 1002. If the asset is determined to be a type A asset, then, in step 1006, information is output indicating that the asset is a type A asset and will terminate at the contractually-specified full term date.

On the other hand, if the asset is determined to be a type B asset, then step 1008 is performed. This step 1008 entails discriminating the likelihood that a certain event will happen for each of a series of consecutive time intervals. In the context of loan processing, step 1008 entails determining the probability of a loan terminating in each of plurality of consecutive time intervals (e.g., 3 months, 6 months, 9 months, 1 year, and so on). Step 1008 is followed by step 1010, which formally outputs the probabilistic time-based information calculated in step 1008, Finally, step 1012 organizes the assets into different groups depending on the results of steps 1006 and 1010. In the case discussed above, step 1012 can group the assets into a first group that identifies those assets that have a high probability of going full term, a third group that identifies those assets that have a high probability of terminating early, and a third group that identifies all other assets (e.g., those that could either go full term or terminate early). Step 1012 can also entail presenting the results of its clustering analysis to the analyst, e.g., using various kinds of graphical representations.

FIG. 11 shows one exemplary presentation 1100 for illustrating when loans will terminate. A group of assets 1102 includes a group of n assets having icons numbered 1-n. Bars that horizontally extend from each of the icons contain information that indicates whether each loan is likely to fall within each of above-described three categories for a plurality of consecutive intervals of time (e.g., 3 months, 6 months, 9 months, 1 year, etc.). For instance, loans 1 and 2 are indicated as likely to go full term for all time intervals. Loan 3 is indicated as likely to go the full term until a predetermined time is reached. After this time, FIG. 11 indicates that the customer may possibly terminate the loan early. This may reflect a common psychological approach to the payment of loans; when a customer gets reasonably close to entirely paying off a loan, a customer may feel compelled to pay it off early for the satisfaction of terminating the loan. Loan 5 is indicated as having a high probability of not terminating until a first time is reached. After that first time is reached, the loan is indicated as having only a midlevel probability of not terminating, and this midlevel probability extends until a second time is reached. After the second time is reached, the loan is indicated as having a high probability of terminating early. Accordingly, an analyst can view these transitions in probability and make his or her own decisions regarding the likelihood of a particular loan terminating early at a certain time period. Of course, the type of behavior shown in FIG. 11 is merely exemplary. Generally, the "all green" status of the first two loans 1104 might reflect the bight-line classification of these loans by the first sub-model 904 that employs logistic regression. The remainder of the loans 1106 shown in FIG. 11 might have been identified as type B assets and subjected to additional survival processing using the second sub-model 906.

The technique described above has several advantages over traditional techniques. First, the survival analysis performed in the second sub-model 906 can potentially provide more fine-grained discrimination compared to traditional survival analysis. This power is achieved because the outlying full-term high probability cases are excluded from the dataset fed to the second sub-model 906. In other words, the second sub-model 906 need no longer span such a large range of probabilities, and therefore can devote greater discriminating power to the more questionable cases that are presented to it. Further, the presentation of tripartite probability information for each of a plurality of time intervals provides the analyst with much more information from which to make business judgments. In contrast, traditional techniques typically formulate answers into simple binary yes-no decisions or into specific predicted dates that contain significant amount of modeling error, thus shielding the underlying subtlety of what is happening in the business from the analyst.

D. Exemplary System for Implementing the Analysis Techniques

Figure 12:
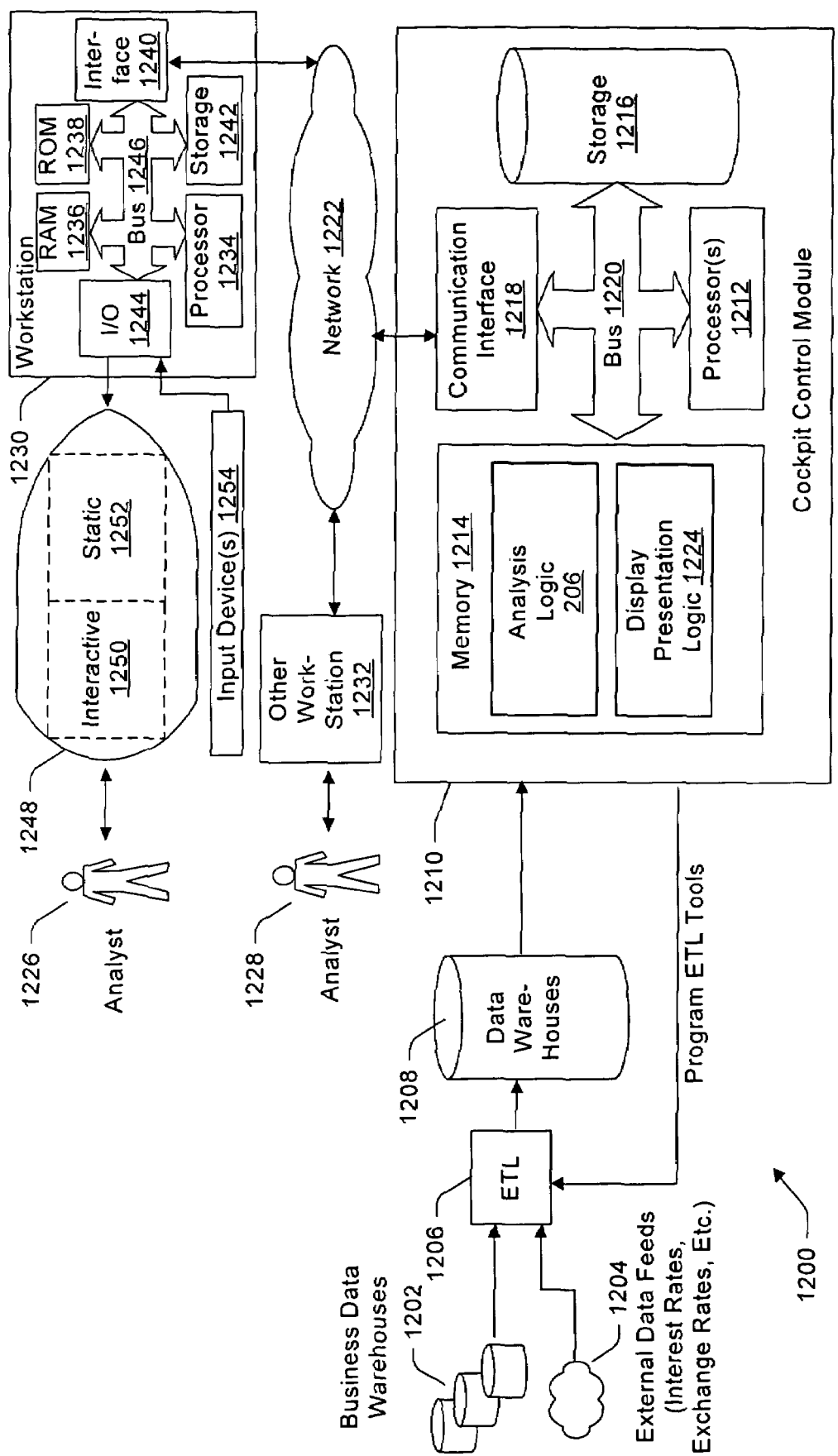
FIG. 12 shows an exemplary architecture for implementing the technique shown in FIG. 2.

Different technical infrastructures can be used to implement the above-described techniques. FIG. 12 shows one exemplary architecture for implementing the above-described techniques. This technical infrastructure corresponds to the digital cockpit architecture described in commonly assigned co-pending U.S. Ser. No. 10/339,116 to Johnson et al., filed on Jan. 9, 2003, entitled "Digital Cockpit," and incorporated herein by reference in its entirety. The technical infrastructure is further described in commonly assigned co-pending U.S. Ser. No. 10/418,428 to LaComb et al., filed on Apr. 18, 2003, entitled "Development of a Model for Integration into a Business Intelligence System," which his also incorporated herein by reference in its entirety.

By way of overview, a so-called digital cockpit is a system that receives information regarding the course of a business operation (as well as additional information having relevance to the operation the business), archives this information, and then analyzes this information. The digital cockpit provides a central console-like mechanism for controlling the analysis performed by the digital cockpit as well visualizing the results of that analysis. In response to the analysis performed by the digital cockpit, an analyst may choose to take some corrective steps within the business. The digital cockpit further provides a mechanism for executing the analyst's decisions by propagating the analyst's commands down through the business in an automated and well-controlled manner. This propagation can be performed via electronic data transfer (e.g., via a hardwired and/or wireless network). The business can include mechanisms for automatically acting on the propagated commands, such as by changing various parameters used in models within the business. Due to these features, the analyst assumes the role of a navigator that effectively steers the business in a desired direction.

Indeed, the techniques described in the preceding sections fit in well with the metaphor of the digital cockpit. One might view a business that is operating in a data-challenged environment as a vehicle that is navigating through a veritable fog. The above-described techniques allow the business to successfully process what little data is available to provide accurate insight into what lies "ahead" of it. Accordingly, the above-described techniques provide yet another mechanism for gaining visibility into the future course of a business as it moves along a directed path.

FIG. 2 shows an exemplary digital cockpit 1200 for implementing the functionality described in FIG. 1. The digital cockpit 1200 receives information from a number of sources both within and external to the business. For instance, the digital cockpit 1200 receives data from business data warehouses 1202. These business data warehouses 1202 store information collected from the business in the normal course of business operations. More specifically, the business data warehouses 1202 can store information collected in the course of performing the steps in stages 210 to 216 shown in FIG. 2. Such business data warehouses 1202 can be located together at one site, or distributed over multiple sites. The digital cockpit 1200 can also receive information from one or more external sources 1204. Such external sources 1204 may represent third party repositories of business information, such as information regarding market performance, etc.

An Extract-Transform-Load (ETL) module 1206 extracts information from the business data warehouses 1202 and the external sources 1204, and performs various transformation operations on such information. The transformation operations can include: 1) performing quality assurance on the extracted data to ensure adherence to pre-defined guidelines, such as various expectations pertaining to the range of data, the validity of data, the internal consistency of data, etc; 2) performing data mapping and transformation, such as mapping identical fields that are defined differently in separate data sources, eliminating duplicates, validating cross-data source consistency, providing data convergence (such as merging records for the same customer from two different data sources), and performing data aggregation and summarization; 3) performing post-transformation quality assurance to ensure that the transformation process does not introduce errors, and to ensure that data convergence operations did not introduce anomalies, etc. The ETL module 1206 also loads the collected and transformed data into a data warehouse 1208. The ETL module 1206 can include one or more selectable tools for performing its ascribed steps, collectively forming an ETL toolset. For instance, the ETL toolset can include one of the tools provided by Informatica Corporation of Redwood City, Calif., and/or one of the tools provided by Data-Junction Corporation of Austin, Tex. Still other tools can be used in the ETL toolset, including tools specifically tailored by the business operation 202 to perform unique in-house functions.

The data warehouse 1208 itself may represent one or more storage devices. If multiple storage devices are used, these storage devices can be located in one central location or distributed over plural sites. Generally, the data warehouse 1208 captures, scrubs, summarizes, and retains the transactional and historical detail necessary to monitor changing conditions and events within the business. Various known commercial products can be used to implement the data warehouse 1208, such as various data storage solutions provided by the Oracle Corporation of Redwood Shores, Calif. The data warehouse 1208 can be used to store the database 204 shown in FIG. 2.

Although not shown in FIG. 12, the digital cockpit architecture 1200 can include other kinds of storage devices and strategies. For instance, the digital cockpit 1200 can include an On-Line Analytical Processing (OLAP) server (not shown). An OLAP server provides an engine that is specifically tailored to perform data manipulation of multi-dimensional data structures. Such multi-dimensional data structures arrange data according to various informational categories (dimensions), such as time, geography, etc. The dimensions serve as indices for retrieving information from a multi-dimensional array of information, such as so-called OLAP cubes.

The digital cockpit 1200 can also include a digital cockpit data mart (not shown) that culls a specific set of information from the data warehouse 1208 for use in performing a specific subset of steps within the business enterprise. For instance, the information provided in the data warehouse 1208 may serve as a global resource for the entire business enterprise. The information culled from this data warehouse 1208 and stored in the data mart (not shown) may correspond to the specific needs of a particular group or sector within the business enterprise.

The information collected and stored in the above-described manner is fed into the cockpit control module 1210. The cockpit control module 1210 can be implemented as any kind of computer device, including one or more processors 1212, various memory media (such as RAK ROM, disc storage, etc.) (e.g., memory 1214 and storage 1216), a communication interface 1218 for communicating with an external entity, a bus 1220 for communicatively coupling system components together, as well as other computer architecture features that are known in the art In one implementation, the cockpit control module 1210 can be implemented as a computer server coupled to a network 1222 via the communication interface 1218. In this case, any kind of server platform can be used, such as server functionality provided by iPlanet, produced by Sun Microsystems, Inc., of Santa Clara, Calif. The network 1222 can comprise any kind of communication network, such as the Internet, a business intranet, a LAN network, an Ethernet connection, etc. The network 1222 can be physically implemented as hardwired links, wireless links, a combination of hardwired and wireless links, or some other architecture.

The memory media 1214 within the cockpit control module 1210 can be used to store the analysis logic 206 introduced in connection with FIG. 2. For instance, the analysis logic 206 can constitute different modules of program instructions stored in RAM memory. More specifically, the analysis logic 206 includes functionality for performing different kinds of analytical operations, such as the kinds of predictive analyses described above that are specifically tailored to deal with incomplete datasets and/or datasets collected from stage-based business operations. A variety of commercially available software products can be used to provide the building blocks from which to construct the analysis logic 206. To name but a small sample, the analysis logic 206 can use one or more of the family of Crystal Ball products produced by Decisioneering, Inc. of Denver Colo., one or more of the Mathematica products produced by Wolfram, Inc. of Champaign Ill., one or more of the SAS products produced by SAS Institute Inc. of Cary, N.C., etc. In general, such tools can execute regression analysis, time-series computations, cluster analysis, simulation, and other types of analyses. The storage 1216 can constitute different databases for storing different groups of records using appropriate data structures. For instance, this storage 1216 can include a database that stores various models scripts. Such models scripts provide instructions for running one or more analytical tools in the analysis logic 206.

The memory 1214 can also store other programs, such as display presentation logic 1224. The display presentation logic 1224 performs various steps associated with displaying the output results of the analyses performed by the analysis logic 206. Such display presentation steps can include presenting probability information that conveys the confidence associated with the output results using different display formats. The display presentation logic 1224 logic can also include functionality specifically tailored to present the kinds of displays discussed in this disclosure, such as the presentation shown in FIG. 11. The display presentation logic 1224 can also include functionality for rotating and scaling a displayed response surface to allow an analyst to view the response surface from different "vantage points," to thereby gain better insight into the characteristics of the response surface.

The memory 1214 can also include do-what logic (not shown). The do-what logic includes the program logic used to develop and/or propagate commands into the business for affecting changes in the business, as is described in detail in the above-described co-pending commonly assigned applications.

Exemplary business analysts 1226 and 1228 can receive information provided by the cockpit control module 1210 using different devices or different media. FIG. 12 shows the use of computer workstations 1230 and 1232 for presenting cockpit information to analysts 1226 and 1228, respectively. This implementation is not limitative; in addition, the cockpit control module 1210 can be configured to provide cockpit information to users using laptop computing devices, personal digital assistant (PDA) devices, cellular telephones, printed media, or other technique or device for information dissemination (none of which are shown in FIG. 12). The exemplary workstation 1230 includes conventional computer hardware, including a processor 1234, RAM 1236, ROM 1238, a communication interface 1240 for interacting with a remote entity (such as network 1222), storage 1242 (e.g., an optical and/or hard disc), and an input/output interface 1244 for interacting with various input devices and output devices. These components are coupled together using bus 1246. An exemplary output device includes the cockpit display interface 1248. The cockpit display interface 1248 can present an interactive display 1250, which permits the analyst 1226 to control various aspects of the information presented on the cockpit display interface 1248. Cockpit display interface 1248 can also present a static display 1252, which does not permit the analyst 1226 to control the information presented on the cockpit display interface 1248. The application logic for implementing the interactive display 1250 and the static display 1252 can be provided in the memory storage of the workstation (e.g., the RAM 1236, ROM 1238, or storage 1242, etc.), or can be provided by a computing resource coupled to the workstation 1230 via the network 1222, such as display presentation logic 1224 provided in the cockpit control module 1210.

Finally, an input device 1254 permits the analyst 1226 to interact with the workstation 1230 based on information displayed on the cockpit display interface 1248. The input device 1254 can include a keyboard, a mouse device, a joy stick, a data glove input mechanism, throttle input mechanism, track ball input mechanism, a voice recognition input mechanism, a graphical touch-screen display field, etc., or any combination of these devices.

In operation, the digital cockpit architecture 1200 shown in FIG. 12 can be used to execute the techniques described in previous sections of this disclosure upon the command of the business analyst. That is, an analyst can manually select a dataset to analyze, reflecting information garnished from the data sources 1202 and 1204. The analyst can also manually select one of a plurality of analytical tools to apply to the dataset that incorporate one or more of the above-described principles designed to address the presence of incomplete data (e.g., censored data) and/or stage-based data. The analysis logic 206 performs the core of the analytical operations required by these techniques. Alternatively, the analyst can set up the digital cockpit architecture 1200 such that one or more of the above-described techniques are performed in automated fashion. That is, the digital cockpit 1200 can be configured to automatically perform prescribed analysis on collected data at predetermined times (e.g., every day or every week), and automatically present the results to the analyst. Alternatively, the analysis performed by the analysis logic 206 can be automatically performed upon the occurrence of other predetermined events, such as certain collected data exceeding a prescribed threshold, and so on.

FIG. 12 is not limitative of the kinds of systems that can be used to implement the techniques described above in previous sections. For example, the techniques can be implemented using a standalone computer, etc. Generally, in any implementation, the functions described in preceding sections can be implemented in software, application-specific hardware (e.g., application specific logic circuitry), or a combination of software and application-specific hardware. If the case of a software implementation, the logic functions are implemented by a collection of machine-readable instructions stored on a storage medium, which, when executed on a processor device (e.g., a CPU), implements the above-described techniques.

E. Conclusion

Techniques for effectively analyzing incomplete datasets and/or datasets indicative of stage-based business operations were described. The techniques provide reliable tools for gaining insight into the projected courses of businesses in the unique data-challenged environments maintained by some businesses.

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method for performing business-related analysis, comprising:
    generating a predicted value using a model that is based on censored data collected from a multi-stage business operation using an electronic data processing apparatus, the predicted value containing an error attributed to information that is missing from the censored data within a specified time interval;
    performing a trending operation using trending logic executed by the electronic data processing apparatus to derive a standardized score that pertains to a variance of the predicted value with respect to other predicted values generated using the model for the specified time interval;
    performing a de-trending operation using de-trending logic executed by the electronic data processing apparatus to reduce the error in the predicted value based on the standardized score calculated in the trending logic, wherein the de-trending operation comprises the steps of:
        computing an actual mean of actual values for the specified time interval;
        computing an actual standard deviation of actual values for the specified time interval; and
        computing an output result by multiplying the standardized score calculated in the trending logic by the actual standard deviation to produce a product, and adding the actual mean to the product;
    generating an electrical signal representative of the output result that includes probability information associated with the output result; and
    controlling the multi-stage business operation based on the output result.

2. The method according to claim 1, wherein the trending operation comprises:
    computing a predicted mean of a collection of predicted values within the specified time interval;
    computing a predicted standard deviation of the predicted values within the specified time interval; and
    computing the standardized score by subtracting the predicted mean from the predicted value to produce a difference, and dividing the difference by the predicted standard deviation.

3. The method according to claim 1, wherein the censored data contains at least 30 percent missing information relative to a total population of potential information.

4. The method according to claim 1, wherein the business operation pertains to a business in which vehicles are leased to customers, and wherein the censored data includes cycle time values that reflect the respective amounts of time for which the customers lease the vehicles.

5. The method according to claim 4, wherein missing information from the censored data corresponds to vehicles that have not yet been returned by respective customers, and thus for which the cycle time values are not yet determined.

6. The method according to claim 4, wherein the predicted value pertains to an estimate of when a customer will return a leased vehicle.

7. The method according to claim 1, wherein the model comprises a plurality of sub-models corresponding to a respective stage of the multi-stage business operation.

8. A program storage device readable by an electronic data processing apparatus, tangibly embodying a program of instructions executable by the apparatus to perform method steps, said method steps comprising:
    generating a predicted value using a model that is based on censored data collected from a multi-stage business operation using an electronic data processing apparatus, the predicted value containing an error attributed to information that is missing from the censored data within a specified time interval;
    performing a trending operation using trending logic executed by the electronic data processing apparatus to derive a standardized score that pertains to a variance of the predicted value with respect to other predicted values generated using the model for the specified time interval;
    performing a de-trending operation using de-trending logic executed by the electronic data processing apparatus to reduce the error in the predicted value based on the standardized score calculated in the trending logic, wherein the de-trending operation comprises the steps of:
        computing an actual mean of actual values for the specified time interval;
        computing an actual standard deviation of actual values for the specified time interval; and
        computing an output result by multiplying the standardized score calculated in the trending logic by the actual standard deviation to produce a product, and adding the actual mean to the product;
    generating an electrical signal representative of the output result that includes probability information associated with the output result; and
    controlling the multi-stage business operation based on the output result.

9. The device according to claim 8, wherein the trending logic is to further:
    compute a predicted mean of the other predicted values within the specified time interval;
    compute a predicted standard deviation of the other predicted values within the specified time interval;
    compute the standardized score by subtracting the predicted mean from the computed predicted value to produce a difference; and
    divide the different by the predicted standard deviation.

10. The device according to claim 8, wherein the model comprises a plurality of sub-models corresponding to a respective stage of the multi-stage business operation.

* * * * *

UNITED STATES PATENT AND TRADEMARK OFFICE
CERTIFICATE OF CORRECTION

PATENT NO. : 7,676,390 B2  Page 1 of 2
APPLICATION NO. : 10/654738
DATED : March 9, 2010
INVENTOR(S) : Senturk et al.

It is certified that error appears in the above-identified patent and that said Letters Patent is hereby corrected as shown below:

In Fig. 1, Sheet 1 of 12, below "Fig. 1" insert -- Prior Art --.

In Column 4, Line 38, delete "pertain" and insert -- pertains --, therefor.

In Column 4, Line 39, delete "environment" and insert -- environment. --, therefor.

In Column 9, Line 30, delete "fill" and insert -- full --, therefor.

In Column 9, Line 49, delete "0.226" and insert -- 226 --, therefor.

In Column 11, Line 34, delete "14" and insert -- 1-4 --, therefor.

In Column 11, Line 41, delete "14." and insert -- 1-4. --, therefor.

In Column 13, Line 2, delete "actual a" and insert -- actual σ --, therefor.

In Column 13, Line 47, delete "a" and insert -- σ --, therefor.

In Column 13, Line 54, delete "a, where the actual a" and insert -- σ, where the actual σ --, therefor.

In Column 14, Line 22, delete "14." and insert -- 1-4. --, therefor.

In Column 15, Line 17, delete "$Y_a$'s" and insert -- $Y_a$'s. --, therefor.

In Column 15, Line 36, delete "data" and insert -- data. --, therefor.

In Column 16, Line 27, delete "$X_a$-$Y_n$" and insert -- $X_a$-$X_n$ --, therefor.

In Column 16, Line 66, delete "loan" and insert -- loan. --, therefor.

Signed and Sealed this

Thirty-first Day of August, 2010

David J. Kappos
*Director of the United States Patent and Trademark Office*

CERTIFICATE OF CORRECTION (continued)
U.S. Pat. No. 7,676,390 B2

In Column 18, Line 5, delete "an the" and insert -- the --, therefor.

In Column 20, Line 34, delete "fill" and insert -- full --, therefor.

In Column 21, Line 55, delete "fill" and insert -- full --, therefor.

In Column 22, Line 21, delete "1008," and insert -- 1008. --, therefor.

In Column 25, Line 5, delete "RAK" and insert -- RAM, --, therefor.